US012084844B2

(12) United States Patent
Gibson et al.

(10) Patent No.: US 12,084,844 B2
(45) Date of Patent: *Sep. 10, 2024

(54) HYDRANT NOZZLE CAP ADAPTER

(71) Applicant: Mueller International, LLC, Atlanta, GA (US)

(72) Inventors: Daryl Lee Gibson, Chattanooga, TN (US); Timofey Sitnikov, McDonald, TN (US); Paul S. Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,359

(22) Filed: Nov. 29, 2022

(65) Prior Publication Data

US 2023/0092513 A1 Mar. 23, 2023

Related U.S. Application Data

(63) Continuation of application No. 16/874,340, filed on May 14, 2020, now Pat. No. 11,542,690.

(51) Int. Cl.
*E03B 9/06* (2006.01)
*F16L 37/248* (2006.01)
(Continued)

(52) U.S. Cl.
CPC .............. *E03B 9/06* (2013.01); *F16L 37/248* (2013.01); *F16L 37/252* (2013.01);
(Continued)

(58) Field of Classification Search
CPC .... E03B 9/06; Y10T 137/5468; F16L 37/248; F16L 37/252; F16L 55/1155; F16L 55/1157
See application file for complete search history.

(56) References Cited

U.S. PATENT DOCUMENTS 1,738,094 A ‡ 12/1929 Caldwell
2,171,173 A ‡ 8/1939 Coyer
(Continued)

FOREIGN PATENT DOCUMENTS

AU 2011265675 ‡ 5/2015
AU 2015202550 ‡ 11/2017
(Continued)

OTHER PUBLICATIONS

US 11,296,403 B2, 04/2022, Gibson et al. (withdrawn)
(Continued)

*Primary Examiner* — Kevin F Murphy
(74) *Attorney, Agent, or Firm* — Taylor English Duma LLP

(57) ABSTRACT

A nozzle cap adapter includes an adapter ring defining a first adapter ring end, a second adapter ring end opposite the first adapter ring end, and an interior void extending from the first adapter ring end to the second adapter ring end; a nozzle connector extending from the second adapter ring end of the adapter ring, the nozzle connector configured to rotatably engage a fire hydrant nozzle; and a latch coupled to the adapter ring and configured to removably lock the nozzle cap adapter onto the fire hydrant nozzle; a gasket housing extending into the interior void and defining a gasket groove, the gasket groove facing the second adapter ring end; and a gasket disposed within the gasket groove and configured to abut an end of the fire hydrant nozzle.

19 Claims, 13 Drawing Sheets

(51) Int. Cl.
*F16L 37/252* (2006.01)
*F16L 55/115* (2006.01)

(52) U.S. Cl.
CPC ....... *F16L 55/1155* (2013.01); *F16L 55/1157* (2013.01); *Y10T 137/5468* (2015.04)

(56) References Cited

U.S. PATENT DOCUMENTS

| | | | | |
|---|---|---|---|---|
| 3,254,528 | A | ‡ | 6/1966 | Michael |
| 3,592,967 | A | ‡ | 7/1971 | Harris |
| 3,612,922 | A | ‡ | 10/1971 | Furnival |
| 3,662,600 | A | ‡ | 5/1972 | Rosano, Jr. |
| 3,673,856 | A | ‡ | 7/1972 | Panigati |
| 3,731,534 | A | ‡ | 5/1973 | Painley |
| 3,815,129 | A | ‡ | 6/1974 | Sweany ................ B06B 1/0261 340/384.73 |
| 4,000,753 | A | ‡ | 1/1977 | Ellis ......................... E03B 9/04 411/948 |
| 4,056,970 | A | ‡ | 11/1977 | Sollish |
| 4,083,229 | A | ‡ | 4/1978 | Anway ................. G01M 3/243 73/405 A |
| 4,156,156 | A | ‡ | 5/1979 | Sweany |
| 4,333,028 | A | ‡ | 6/1982 | Panton .................. B06B 1/0618 310/326 |
| 4,431,873 | A | ‡ | 2/1984 | Dunn |
| 4,462,249 | A | ‡ | 7/1984 | Adams ................ B67D 7/3209 73/405 A |
| 4,467,236 | A | ‡ | 8/1984 | Kolm ................ H01L 41/1136 310/329 |
| 4,543,817 | A | ‡ | 10/1985 | Sugiyama |
| 4,763,686 | A | ‡ | 8/1988 | Laurel ...................... E03B 9/04 285/305 |
| 4,796,466 | A | ‡ | 1/1989 | Farmer .................... F17D 5/02 73/49.1 |
| 4,827,969 | A | | 5/1989 | Lyasko |
| 4,844,396 | A | ‡ | 7/1989 | Norton ................... F16L 55/00 248/230.8 |
| 4,893,679 | A | ‡ | 1/1990 | Fischer .................. A62C 37/12 169/42 |
| 4,930,358 | A | ‡ | 6/1990 | Motegi ................... G01F 1/662 73/861.28 |
| 4,984,498 | A | ‡ | 1/1991 | Fishman |
| 5,038,614 | A | ‡ | 8/1991 | Bseisu |
| 5,052,215 | A | ‡ | 10/1991 | Lewis |
| 5,078,006 | A | ‡ | 1/1992 | Maresca, Jr. |
| 5,085,082 | A | ‡ | 2/1992 | Cantor |
| 5,090,234 | A | ‡ | 2/1992 | Maresca, Jr. |
| 5,117,676 | A | ‡ | 6/1992 | Chang |
| 5,118,464 | A | ‡ | 6/1992 | Richardson |
| 5,163,314 | A | ‡ | 11/1992 | Maresca, Jr. |
| 5,165,280 | A | ‡ | 11/1992 | Sternberg |
| 5,170,657 | A | ‡ | 12/1992 | Maresca |
| 5,174,155 | A | ‡ | 12/1992 | Sugimoto |
| 5,184,851 | A | ‡ | 2/1993 | Sparling ............... F16L 37/252 285/85 |
| 5,187,973 | A | ‡ | 2/1993 | Kunze |
| 5,189,904 | A | ‡ | 3/1993 | Maresca ............. G01M 3/2892 73/405 R |
| 5,201,226 | A | ‡ | 4/1993 | John ...................... G01N 29/27 73/866.5 |
| 5,203,202 | A | ‡ | 4/1993 | Spencer ................ G01M 3/165 73/40 |
| 5,205,173 | A | ‡ | 4/1993 | Allen ..................... G01M 3/243 73/405 A |
| 5,209,125 | A | ‡ | 5/1993 | Chitty .................. G01F 1/3263 73/861.24 |
| 5,218,859 | A | ‡ | 6/1993 | Stenstrom |
| 5,243,862 | A | ‡ | 9/1993 | Latimer ............... G01N 29/043 73/622 |
| 5,254,944 | A | ‡ | 10/1993 | Coradi ................. G01N 27/902 324/238 |
| 5,272,646 | A | ‡ | 12/1993 | Farmer ................ G01M 3/2807 702/51 |
| 5,279,160 | A | ‡ | 1/1994 | Koch ..................... G01N 27/83 324/226 |
| 5,287,884 | A | ‡ | 2/1994 | Cohen ................... E03B 7/071 137/460 |
| 5,298,894 | A | ‡ | 3/1994 | Cerny ................... G01D 4/006 343/719 |
| 5,301,985 | A | ‡ | 4/1994 | Terzini ................. F16L 37/113 285/376 |
| 5,303,592 | A | ‡ | 4/1994 | Livingston ............. G01N 29/27 73/152.01 |
| 5,319,956 | A | ‡ | 6/1994 | Bogle |
| 5,333,501 | A | ‡ | 8/1994 | Okada |
| 5,335,547 | A | ‡ | 8/1994 | Nakajima |
| 5,343,737 | A | ‡ | 9/1994 | Baumoel |
| 5,349,568 | A | ‡ | 9/1994 | Kupperman .......... G01M 3/243 367/172 |
| 5,351,655 | A | ‡ | 10/1994 | Nuspl ................... F22B 37/421 122/504 |
| 5,361,636 | A | ‡ | 11/1994 | Cremean ............... G01M 3/243 73/405 A |
| 5,367,911 | A | ‡ | 11/1994 | Jewell |
| 5,385,049 | A | ‡ | 1/1995 | Hunt |
| 5,396,800 | A | ‡ | 3/1995 | Drinon |
| 5,408,883 | A | ‡ | 4/1995 | Clark, Jr. |
| 5,416,724 | A | ‡ | 5/1995 | Savic |
| 5,461,906 | A | ‡ | 10/1995 | Bogle |
| 5,519,184 | A | ‡ | 5/1996 | Umlas .................. B23K 26/206 219/121.64 |
| 5,526,691 | A | ‡ | 6/1996 | Latimer |
| 5,531,099 | A | ‡ | 7/1996 | Russo |
| 5,548,530 | A | ‡ | 8/1996 | Baumoel ............... G01M 3/243 73/405 A |
| 5,581,037 | A | ‡ | 12/1996 | Kwun |
| 5,591,912 | A | ‡ | 1/1997 | Nance .................. G01N 29/265 73/598 |
| 5,602,327 | A | ‡ | 2/1997 | Torizuka |
| 5,611,948 | A | ‡ | 3/1997 | Hawkins ................ B65H 63/00 376/245 |
| 5,619,423 | A | ‡ | 4/1997 | Scrantz ............... G01N 29/2412 324/229 |
| 5,623,203 | A | ‡ | 4/1997 | Hosohara |
| 5,633,467 | A | ‡ | 5/1997 | Paulson |
| 5,639,958 | A | ‡ | 6/1997 | Lange |
| 5,655,561 | A | ‡ | 8/1997 | Freitag ................. G01F 23/243 137/59 |
| 5,686,828 | A | ‡ | 11/1997 | Peterman ................ G01M 3/40 324/71.1 |
| 5,708,195 | A | | 1/1998 | Kurisu et al. |
| 5,708,211 | A | ‡ | 1/1998 | Jepson ................... F17D 1/005 73/861.04 |
| 5,746,611 | A | ‡ | 5/1998 | Bentley ............... H01R 13/5213 439/364 |
| 5,754,101 | A | ‡ | 5/1998 | Tsunetomi .......... B60C 23/0496 73/146.8 |
| 5,760,306 | A | | 6/1998 | Sheppard ............. G01N 27/9013 73/623 |
| 5,789,720 | A | ‡ | 8/1998 | Kozak .................... B23K 26/28 219/121.64 |
| 5,798,457 | A | ‡ | 8/1998 | Paulson |
| 5,838,633 | A | ‡ | 11/1998 | Sinha ....................... G01V 1/50 367/32 |
| 5,866,820 | A | ‡ | 2/1999 | Camplin |
| 5,892,163 | A | ‡ | 4/1999 | Johnson ................... G01M 3/02 73/865.8 |
| 5,898,412 | A | ‡ | 4/1999 | Jones ....................... H01Q 1/02 343/878 |
| 5,907,100 | A | ‡ | 5/1999 | Cook .................. G01N 29/2412 73/622 |
| 5,965,818 | A | ‡ | 10/1999 | Wang ..................... G01B 17/02 73/598 |
| 5,970,434 | A | ‡ | 10/1999 | Brophy |
| 5,974,862 | A | ‡ | 11/1999 | Lander |
| 5,987,990 | A | ‡ | 11/1999 | Worthington .......... G01N 29/14 73/594 |
| 6,000,277 | A | ‡ | 12/1999 | Maple ..................... F17D 5/00 73/789 |

(56) References Cited

U.S. PATENT DOCUMENTS

| | | | | |
|---|---|---|---|---|
| 6,000,288 | A | ‡ | 12/1999 | Bartels .................. G01B 17/00 |
| | | | | 73/602 |
| 6,003,376 | A | ‡ | 12/1999 | Burns |
| 6,023,986 | A | ‡ | 2/2000 | Smith |
| 6,035,717 | A | ‡ | 3/2000 | Carodiskey |
| 6,058,957 | A | ‡ | 5/2000 | Honigsbaum |
| 6,076,407 | A | ‡ | 6/2000 | Levesque |
| 6,082,193 | A | ‡ | 7/2000 | Paulson |
| 6,089,253 | A | ‡ | 7/2000 | Istre ........................ E03B 9/10 |
| | | | | 70/276 |
| 6,102,444 | A | ‡ | 8/2000 | Kozey .................. F16L 37/252 |
| | | | | 285/376 |
| 6,104,349 | A | ‡ | 8/2000 | Cohen |
| 6,125,703 | A | ‡ | 10/2000 | Latimer ............. G01N 29/0609 |
| | | | | 73/598 |
| 6,127,823 | A | ‡ | 10/2000 | Atherton .............. G01N 27/902 |
| | | | | 324/240 |
| 6,127,987 | A | ‡ | 10/2000 | Maruyama |
| 6,133,885 | A | ‡ | 10/2000 | Luniak ................. H01Q 1/242 |
| | | | | 343/702 |
| 6,138,512 | A | ‡ | 10/2000 | Clark .................... G01M 3/243 |
| | | | | 73/40 |
| 6,138,514 | A | ‡ | 10/2000 | Iwamoto |
| 6,164,137 | A | ‡ | 12/2000 | Hancock ................ G01N 29/07 |
| | | | | 73/598 |
| 6,170,334 | B1 | ‡ | 1/2001 | Paulson |
| 6,175,380 | B1 | ‡ | 1/2001 | Van Den Bosch |
| 6,181,294 | B1 | ‡ | 1/2001 | Justice .................. G01D 4/004 |
| | | | | 343/703 |
| 6,192,352 | B1 | ‡ | 2/2001 | Alouani ............... G05B 13/027 |
| | | | | 706/2 |
| 6,243,657 | B1 | ‡ | 6/2001 | Tuck |
| 6,267,000 | B1 | ‡ | 7/2001 | Harper |
| 6,276,213 | B1 | ‡ | 8/2001 | Humphrey ............... G01H 1/00 |
| | | | | 73/660 |
| 6,296,066 | B1 | ‡ | 10/2001 | Terry |
| 6,343,510 | B1 | ‡ | 2/2002 | Chevrier ............ G01N 29/0672 |
| | | | | 73/659 |
| 6,363,788 | B1 | ‡ | 4/2002 | Gorman |
| 6,389,881 | B1 | ‡ | 5/2002 | Yang |
| 6,401,525 | B1 | ‡ | 6/2002 | Jamieson |
| 6,404,343 | B1 | ‡ | 6/2002 | Andou |
| 6,442,999 | B1 | ‡ | 9/2002 | Baumoel |
| 6,450,542 | B1 | ‡ | 9/2002 | McCue ................... F16L 25/14 |
| | | | | 285/376 |
| 6,453,247 | B1 | | 9/2002 | Hunaidi |
| 6,470,749 | B1 | ‡ | 10/2002 | Han |
| 6,530,263 | B1 | ‡ | 3/2003 | Chana |
| 6,561,032 | B1 | ‡ | 5/2003 | Hunaidi |
| 6,567,006 | B1 | ‡ | 5/2003 | Lander .................. G01M 3/243 |
| | | | | 73/152.58 |
| 6,578,422 | B2 | ‡ | 6/2003 | Lam |
| 6,595,038 | B2 | ‡ | 7/2003 | Williams |
| 6,606,059 | B1 | ‡ | 8/2003 | Barabash .............. H01Q 21/20 |
| | | | | 343/702 |
| 6,624,628 | B1 | ‡ | 9/2003 | Kwun |
| 6,639,562 | B2 | ‡ | 10/2003 | Suganthan ............. H01Q 11/08 |
| | | | | 343/702 |
| 6,647,762 | B1 | ‡ | 11/2003 | Roy |
| 6,651,503 | B2 | ‡ | 11/2003 | Bazarov |
| 6,666,095 | B2 | ‡ | 12/2003 | Thomas |
| 6,667,709 | B1 | ‡ | 12/2003 | Hansen .................. G01S 13/86 |
| | | | | 367/128 |
| 6,707,762 | B1 | ‡ | 3/2004 | Bishop ................. G01M 3/243 |
| | | | | 73/405 A |
| 6,710,600 | B1 | ‡ | 3/2004 | Kopecki |
| 6,725,705 | B1 | ‡ | 4/2004 | Huebler ................ G01M 3/243 |
| | | | | 73/405 A |
| 6,734,674 | B1 | ‡ | 5/2004 | Struse ..................... G01M 3/18 |
| | | | | 324/693 |
| 6,745,136 | B2 | ‡ | 6/2004 | Lam |
| 6,751,560 | B1 | ‡ | 6/2004 | Tingley |
| 6,763,730 | B1 | ‡ | 7/2004 | Wray |
| 6,772,636 | B2 | ‡ | 8/2004 | Lam |
| 6,772,637 | B2 | ‡ | 8/2004 | Bazarov |
| 6,772,638 | B2 | ‡ | 8/2004 | Matney |
| 6,781,369 | B2 | ‡ | 8/2004 | Paulson |
| 6,782,751 | B2 | ‡ | 8/2004 | Linares |
| 6,789,427 | B2 | ‡ | 9/2004 | Batzinger |
| 6,791,318 | B2 | ‡ | 9/2004 | Paulson |
| 6,799,455 | B1 | ‡ | 10/2004 | Lundquist .......... B60C 23/0408 |
| | | | | 73/146 |
| 6,799,466 | B2 | ‡ | 10/2004 | Chinn |
| 6,813,949 | B2 | ‡ | 11/2004 | Masaniello |
| 6,813,950 | B2 | ‡ | 11/2004 | Glascock |
| 6,820,016 | B2 | ‡ | 11/2004 | Brown |
| 6,822,742 | B1 | ‡ | 11/2004 | Kalayeh .................. G01M 3/38 |
| | | | | 73/405 A |
| 6,843,131 | B2 | ‡ | 1/2005 | Graff |
| 6,848,313 | B2 | ‡ | 2/2005 | Kreig |
| 6,851,319 | B2 | ‡ | 2/2005 | Gorman ................. G01B 17/02 |
| | | | | 73/598 |
| 6,889,703 | B2 | ‡ | 5/2005 | Bond |
| 6,904,818 | B2 | ‡ | 6/2005 | Harthorn |
| 6,912,472 | B2 | ‡ | 6/2005 | Mizushina |
| 6,920,792 | B2 | ‡ | 7/2005 | Flora |
| 6,931,931 | B2 | ‡ | 8/2005 | Graff |
| 6,935,178 | B2 | ‡ | 8/2005 | Prause |
| 6,945,113 | B2 | ‡ | 9/2005 | Lester .................. G01N 29/275 |
| | | | | 73/622 |
| 6,957,157 | B2 | ‡ | 10/2005 | Lander ................. G01M 3/243 |
| | | | | 73/152.58 |
| 6,968,727 | B2 | ‡ | 11/2005 | Kim ...................... G01N 29/07 |
| | | | | 73/1.82 |
| 6,978,832 | B2 | ‡ | 12/2005 | Gardner ................. E21B 43/26 |
| | | | | 166/305.1 |
| 7,051,577 | B2 | ‡ | 5/2006 | Komninos |
| 7,080,557 | B2 | ‡ | 7/2006 | Adnan |
| 7,109,929 | B1 | ‡ | 9/2006 | Davis .................. H01Q 21/0075 |
| | | | | 343/705 |
| 7,111,516 | B2 | ‡ | 9/2006 | Bazarov |
| 7,128,083 | B2 | | 10/2006 | Fleury, Jr. et al. |
| 7,140,253 | B2 | ‡ | 11/2006 | Merki |
| 7,143,659 | B2 | ‡ | 12/2006 | Stout |
| 7,171,854 | B2 | ‡ | 2/2007 | Nagashima |
| 7,231,331 | B2 | ‡ | 6/2007 | Davis |
| 7,234,355 | B2 | ‡ | 6/2007 | Dewangan |
| 7,240,574 | B2 | ‡ | 7/2007 | Sapelnikov |
| 7,255,007 | B2 | ‡ | 8/2007 | Messer |
| 7,261,002 | B1 | ‡ | 8/2007 | Bryant .................... G01F 1/708 |
| | | | | 73/861.42 |
| 7,266,992 | B2 | ‡ | 9/2007 | Shamout |
| 7,274,996 | B2 | ‡ | 9/2007 | Lapinski |
| 7,283,063 | B2 | | 10/2007 | Salser, Jr. |
| 7,284,433 | B2 | ‡ | 10/2007 | Ales |
| 7,293,461 | B1 | ‡ | 11/2007 | Girndt |
| 7,299,697 | B2 | ‡ | 11/2007 | Siddu |
| 7,310,877 | B2 | ‡ | 12/2007 | Cao |
| 7,328,618 | B2 | ‡ | 2/2008 | Alex ...................... G01B 17/02 |
| | | | | 73/598 |
| 7,331,215 | B2 | ‡ | 2/2008 | Bond |
| 7,356,444 | B2 | ‡ | 4/2008 | Blemel |
| 7,360,462 | B2 | ‡ | 4/2008 | Nozaki |
| 7,373,808 | B2 | ‡ | 5/2008 | Zanker |
| 7,380,466 | B2 | ‡ | 6/2008 | Deeg |
| 7,383,721 | B2 | ‡ | 6/2008 | Parsons |
| 7,392,709 | B2 | ‡ | 7/2008 | Eckert |
| 7,405,391 | B2 | ‡ | 7/2008 | Ogisu |
| 7,412,882 | B2 | ‡ | 8/2008 | Lazar |
| 7,412,890 | B1 | ‡ | 8/2008 | Johnson |
| 7,414,395 | B2 | ‡ | 8/2008 | Gao ........................... G01N 27/82 |
| | | | | 324/228 |
| 7,426,879 | B2 | ‡ | 9/2008 | Nozaki |
| 7,458,267 | B2 | ‡ | 12/2008 | McCoy |
| 7,475,596 | B2 | ‡ | 1/2009 | Hunaidi |
| 7,493,817 | B2 | ‡ | 2/2009 | Germata ................... F16L 55/40 |
| | | | | 73/592 |
| 7,523,666 | B2 | ‡ | 4/2009 | Thompson |
| 7,526,944 | B2 | ‡ | 5/2009 | Sabata |
| 7,530,270 | B2 | ‡ | 5/2009 | Nozaki |
| 7,543,500 | B2 | ‡ | 6/2009 | Litzenberg |

(56) References Cited

U.S. PATENT DOCUMENTS

| | | | |
|---|---|---|---|
| 7,554,345 B2 ‡ | 6/2009 | Vokey | E04D 13/006 |
| | | | 52/749.12 |
| 7,564,540 B2 ‡ | 7/2009 | Paulson | |
| 7,587,942 B2 ‡ | 9/2009 | Smith | |
| 7,590,496 B2 ‡ | 9/2009 | Blemel | F17D 5/02 |
| | | | 385/12 |
| 7,596,458 B2 ‡ | 9/2009 | Lander | G01M 3/243 |
| | | | 702/56 |
| 7,607,351 B2 ‡ | 10/2009 | Allison | |
| 7,623,427 B2 ‡ | 11/2009 | Jann | |
| 7,647,829 B2 ‡ | 1/2010 | Junker | |
| 7,650,790 B2 ‡ | 1/2010 | Wright | |
| 7,657,403 B2 ‡ | 2/2010 | Stripf | |
| 7,668,670 B2 ‡ | 2/2010 | Lander | |
| 7,680,625 B2 ‡ | 3/2010 | Trowbridge | |
| 7,690,258 B2 ‡ | 4/2010 | Minagi | |
| 7,694,564 B2 ‡ | 4/2010 | Brignac | |
| 7,696,940 B1 ‡ | 4/2010 | MacDonald | H01Q 19/30 |
| | | | 343/834 |
| 7,711,217 B2 ‡ | 5/2010 | Takahashi | |
| 7,751,989 B2 ‡ | 7/2010 | Owens | |
| 7,810,378 B2 ‡ | 10/2010 | Hunaidi | G01M 3/243 |
| | | | 73/49.1 |
| 7,980,317 B1 | 7/2011 | Preta et al. | |
| 8,009,108 B2 | 8/2011 | Eisenbeis et al. | |
| 8,020,579 B2 | 9/2011 | Ruhs | |
| 8,319,508 B2 ‡ | 11/2012 | Vokey | |
| 8,353,309 B1 ‡ | 1/2013 | Embry | A62C 35/20 |
| | | | 70/164 |
| 8,589,092 B2 | 11/2013 | Plouffe et al. | |
| 8,614,745 B1 ‡ | 12/2013 | Al Azemi | H04N 7/183 |
| | | | 348/159 |
| 8,657,021 B1 ‡ | 2/2014 | Preta | A62C 37/50 |
| | | | 169/61 |
| 8,668,206 B2 ‡ | 3/2014 | Ball | G01F 15/185 |
| | | | 277/630 |
| 8,674,830 B2 ‡ | 3/2014 | Lanham | |
| 8,823,509 B2 | 9/2014 | Hyland et al. | |
| 8,843,241 B2 ‡ | 9/2014 | Saberi | |
| 8,931,505 B2 ‡ | 1/2015 | Barker | A62C 35/20 |
| | | | 340/603 |
| 9,053,519 B2 ‡ | 6/2015 | Scolnicov | |
| 9,291,520 B2 ‡ | 3/2016 | Dintakuri | B26F 1/14 |
| | | | 83/13 |
| 9,315,973 B2 ‡ | 4/2016 | Varman | |
| 9,496,943 B2 ‡ | 11/2016 | Parish | E03B 9/02 |
| 9,528,903 B2 ‡ | 12/2016 | Zusman | |
| 9,562,623 B2 ‡ | 2/2017 | Clark | F16K 37/0041 |
| 9,593,999 B2 ‡ | 3/2017 | Dintakuri | E03B 7/003 |
| 9,670,650 B2 | 6/2017 | Pinney et al. | |
| 9,772,250 B2 ‡ | 9/2017 | Dintakuri | B26F 1/14 |
| | | | 83/13 |
| 9,780,433 B2 ‡ | 10/2017 | Schwengler | |
| 9,799,204 B2 ‡ | 10/2017 | Hyland | |
| 9,849,322 B2 ‡ | 12/2017 | Barker | A62C 35/20 |
| | | | 73/168 |
| 9,861,848 B2 ‡ | 1/2018 | Barker | A62C 35/20 |
| | | | 73/405 R |
| 9,970,805 B2 ‡ | 5/2018 | Cole | G01F 15/185 |
| 10,175,135 B2 ‡ | 1/2019 | Dintakurt | E03B 7/003 |
| | | | 702/51 |
| 10,283,857 B2 ‡ | 5/2019 | Dunn | E03B 9/06 |
| 10,305,178 B2 ‡ | 5/2019 | Dunn | H01Q 1/36 |
| 10,317,384 B2 ‡ | 6/2019 | Morrow | |
| 10,386,257 B2 ‡ | 8/2019 | Dintakurti | E03B 7/003 |
| 10,857,403 B2 ‡ | 12/2020 | Hyland | A62C 35/20 |
| 10,859,462 B2 ‡ | 12/2020 | Gibson | E03B 9/06 |
| 10,881,888 B2 ‡ | 1/2021 | Barker | A62C 35/20 |
| 11,047,761 B1 ‡ | 6/2021 | Frackelton | G01M 3/2815 |
| 11,067,464 B2 ‡ | 7/2021 | Aguilera | E03B 9/02 |
| 11,336,004 B2 ‡ | 5/2022 | Gibson | H01Q 1/36 |
| 11,342,656 B2 ‡ | 5/2022 | Gibson | E03B 9/02 |
| 11,422,054 B2 ‡ | 8/2022 | Gibson | G01M 3/243 |
| 11,469,494 B2 ‡ | 10/2022 | Ortiz | H01Q 1/38 |
| 11,473,993 B2 ‡ | 10/2022 | Gibson | F16L 55/1152 |
| 11,527,821 B2 | 12/2022 | Ortiz et al. | |
| 11,542,690 B2 | 1/2023 | Gibson et al. | |
| 11,590,376 B2 | 2/2023 | Hyland et al. | |
| 11,624,674 B2 | 4/2023 | Gibson et al. | |
| 11,630,021 B2 | 4/2023 | Fleury, Jr. et al. | |
| 11,652,284 B2 | 5/2023 | Ortiz et al. | |
| 11,680,865 B2 | 6/2023 | Fleury, Jr. et al. | |
| 11,692,901 B2 | 7/2023 | Gibson et al. | |
| 11,837,782 B2 | 12/2023 | Ortiz et al. | |
| 2001/0045129 A1 ‡ | 11/2001 | Williams | |
| 2002/0043549 A1 ‡ | 4/2002 | Taylor | |
| 2002/0124633 A1 ‡ | 9/2002 | Recane | G01M 3/243 |
| | | | 73/405 A |
| 2002/0159584 A1 ‡ | 10/2002 | Laturell | H04M 1/82 |
| | | | 375/152 |
| 2003/0107485 A1 | 6/2003 | Zoratti | |
| 2003/0150488 A1 ‡ | 8/2003 | Clark | E03B 9/06 |
| | | | 70/164 |
| 2003/0193193 A1 ‡ | 10/2003 | Harrington | F16L 37/252 |
| | | | 285/376 |
| 2004/0129312 A1 ‡ | 7/2004 | Cuzzo | E03B 9/02 |
| | | | 137/296 |
| 2004/0173006 A1 ‡ | 9/2004 | Borntrager | G01M 3/225 |
| | | | 73/40.7 |
| 2004/0187922 A1 ‡ | 9/2004 | Fleury | E03B 9/02 |
| | | | 137/71 |
| 2004/0201215 A1 ‡ | 10/2004 | Steingass | F16L 37/252 |
| | | | 285/376 |
| 2005/0005680 A1 ‡ | 1/2005 | Anderson | G01M 3/042 |
| | | | 73/40 |
| 2005/0067022 A1 ‡ | 3/2005 | Istre | F16L 37/252 |
| | | | 137/512.1 |
| 2005/0072214 A1 ‡ | 4/2005 | Cooper | G01M 3/2815 |
| | | | 73/49.1 |
| 2005/0121880 A1 ‡ | 6/2005 | Santangelo | B60D 1/60 |
| | | | 280/507 |
| 2005/0153586 A1 ‡ | 7/2005 | Girinon | B64D 45/02 |
| | | | 439/92 |
| 2005/0279169 A1 ‡ | 12/2005 | Lander | G01M 3/243 |
| | | | 73/861.03 |
| 2006/0101915 A1 | 5/2006 | Thompson et al. | |
| 2006/0173648 A1 | 8/2006 | Chang | |
| 2006/0174707 A1 ‡ | 8/2006 | Zhang | G01M 3/243 |
| | | | 700/282 |
| 2006/0201550 A1 ‡ | 9/2006 | Blyth | E03B 9/04 |
| | | | 137/294 |
| 2006/0283251 A1 ‡ | 12/2006 | Alex | G01B 17/02 |
| | | | 73/598 |
| 2006/0284784 A1 | 12/2006 | Smith et al. | |
| 2007/0044552 A1 ‡ | 3/2007 | Huang | B60C 23/0408 |
| | | | 73/146 |
| 2007/0051187 A1 ‡ | 3/2007 | McDearmon | F16C 19/522 |
| | | | 73/862.322 |
| 2007/0113618 A1 ‡ | 5/2007 | Yokoi | |
| 2007/0130317 A1 ‡ | 6/2007 | Lander | G01M 3/243 |
| | | | 702/56 |
| 2007/0295406 A1 ‡ | 12/2007 | Clark | E03B 9/16 |
| | | | 137/527.2 |
| 2008/0078567 A1 ‡ | 4/2008 | Miller | |
| 2008/0079640 A1 ‡ | 4/2008 | Yang | H01Q 1/36 |
| | | | 343/702 |
| 2008/0168840 A1 ‡ | 7/2008 | Delgado | G01H 11/08 |
| | | | 73/664 |
| 2008/0189056 A1 ‡ | 8/2008 | Heidl | G01F 15/005 |
| | | | 702/45 |
| 2008/0238711 A1 ‡ | 10/2008 | Lien | G01D 4/008 |
| | | | 361/600 |
| 2008/0281534 A1 ‡ | 11/2008 | Hurley | F17D 5/00 |
| | | | 702/47 |
| 2008/0307623 A1 ‡ | 12/2008 | Furukawa | |
| 2008/0314122 A1 ‡ | 12/2008 | Hunaidi | G01M 3/243 |
| | | | 73/49.1 |
| 2009/0025798 A1 | 1/2009 | Garcia et al. | |
| 2009/0044628 A1 | 2/2009 | Lotscher | |
| 2009/0133887 A1 ‡ | 5/2009 | Brown | E03B 9/04 |
| | | | 137/295 |

(56) References Cited

U.S. PATENT DOCUMENTS

| | | |
|---|---|---|
| 2009/0139336 A1‡ | 6/2009 | Trowbridge, Jr. |
| 2009/0182099 A1‡ | 7/2009 | Noro |
| 2009/0214941 A1‡ | 8/2009 | Buck ................ H01M 10/0481 |
| 2009/0278293 A1‡ | 11/2009 | Yoshinaka |
| 2009/0301571 A1‡ | 12/2009 | Ruhs ........................ E03B 9/06 81/52 |
| 2010/0077234 A1‡ | 3/2010 | Das |
| 2010/0156632 A1‡ | 6/2010 | Hyland |
| 2010/0259461 A1‡ | 10/2010 | Eisenbeis ................ H01Q 1/40 343/873 |
| 2010/0290201 A1‡ | 11/2010 | Takeuchi |
| 2010/0295672 A1‡ | 11/2010 | Hyland |
| 2011/0063124 A1 | 3/2011 | Bartram et al. |
| 2011/0063172 A1‡ | 3/2011 | Podduturi |
| 2011/0066297 A1‡ | 3/2011 | Saberi |
| 2011/0079402 A1‡ | 4/2011 | Becker .................. E21B 33/072 166/85.1 |
| 2011/0102281 A1‡ | 5/2011 | Su .......................... H01Q 1/36 343/742 |
| 2011/0162463 A1‡ | 7/2011 | Allen ...................... G01F 1/662 73/861.27 |
| 2011/0308638 A1‡ | 12/2011 | Barker ................... A62C 35/20 340/603 |
| 2012/0007743 A1‡ | 1/2012 | Solomon |
| 2012/0007744 A1‡ | 1/2012 | Pal |
| 2012/0169560 A1‡ | 7/2012 | Lee |
| 2012/0296580 A1‡ | 11/2012 | Barkay |
| 2012/0324985 A1‡ | 12/2012 | Anin ................... G01F 25/0007 73/405 R |
| 2013/0036796 A1‡ | 2/2013 | Dintakuri ................ E03B 7/003 |
| 2013/0041601 A1‡ | 2/2013 | Dintakurt ................ E03B 7/003 702/51 |
| 2013/0049968 A1‡ | 2/2013 | Dintakuri .................. B26F 1/14 83/13 |
| 2013/0145826 A1‡ | 6/2013 | Dintakuri .................. B26F 1/14 83/13 |
| 2013/0211797 A1‡ | 8/2013 | Scolnicov |
| 2013/0229262 A1‡ | 9/2013 | Bellows ............ G06K 7/10356 343/853 |
| 2013/0298664 A1‡ | 11/2013 | Gillette, II ............. F02D 41/22 138/104 |
| 2013/0321231 A1‡ | 12/2013 | Flores-Cuadras |
| 2014/0206210 A1‡ | 7/2014 | Ritner .................. H01R 12/771 439/84 |
| 2014/0225787 A1‡ | 8/2014 | Annamaa ................ H01Q 1/22 343/702 |
| 2014/0261699 A1 | 9/2014 | Gifford |
| 2014/0373941 A1‡ | 12/2014 | Varman |
| 2015/0070221 A1‡ | 3/2015 | Elford ...................... H01Q 1/04 343/702 |
| 2015/0082868 A1‡ | 3/2015 | Barker ................... A62C 35/20 73/405 R |
| 2015/0128714 A1‡ | 5/2015 | Moss .................... G01L 19/086 73/726 |
| 2015/0247777 A1‡ | 9/2015 | Kondou |
| 2016/0001114 A1‡ | 1/2016 | Barker ................... A62C 35/20 73/168 |
| 2016/0013565 A1‡ | 1/2016 | Ortiz ....................... H05K 1/18 29/601 |
| 2016/0018283 A1‡ | 1/2016 | Dintakurti ............... E03B 7/003 73/405 A |
| 2016/0097696 A1‡ | 4/2016 | Zusman .................. E03B 7/003 29/25.35 |
| 2017/0072238 A1‡ | 3/2017 | Janka ..................... A62C 35/20 |
| 2017/0121949 A1‡ | 5/2017 | Dintakurti .............. E03B 7/003 |
| 2017/0130431 A1‡ | 5/2017 | Pinney .................... E03B 9/02 |
| 2017/0237158 A1‡ | 8/2017 | Dunn ...................... H01Q 1/36 |
| 2017/0237165 A1‡ | 8/2017 | Dunn ...................... E03B 9/06 |
| 2018/0080849 A1‡ | 3/2018 | Breitenfeldt ............ F16B 21/04 73/405 A |
| 2018/0093117 A1‡ | 4/2018 | Barker ................... A62C 35/20 |
| 2018/0224349 A1‡ | 8/2018 | Dintakurti .............. E03B 7/003 |
| 2019/0024352 A1‡ | 1/2019 | Ozburn .................... E03B 9/06 |
| 2019/0214717 A1‡ | 7/2019 | Dunn ....................... H01Q 1/36 |
| 2019/0214718 A1‡ | 7/2019 | Dunn ....................... E03B 9/06 |
| 2019/0316983 A1‡ | 10/2019 | Fleury, Jr. |
| 2020/0069987 A1‡ | 3/2020 | Barker ................... A62C 35/20 |
| 2020/0072697 A1‡ | 3/2020 | Gibson |
| 2020/0212549 A1‡ | 7/2020 | Gibson |
| 2020/0232863 A1‡ | 7/2020 | Moreno ................ G01L 19/141 |
| 2020/0232864 A1‡ | 7/2020 | Moreno ................ G01M 3/3272 |
| 2020/0378859 A1‡ | 12/2020 | Gibson .................. F16L 55/1108 |
| 2021/0023408 A1‡ | 1/2021 | Barker ................... A62C 35/20 |
| 2021/0041323 A1‡ | 2/2021 | Gibson |
| 2021/0247261 A1‡ | 8/2021 | Gibson .................... E03B 7/003 |
| 2021/0249765 A1‡ | 8/2021 | Dunn ....................... E03B 9/06 |
| 2021/0355661 A1 | 11/2021 | Gibson et al. |
| 2022/0082467 A1‡ | 3/2022 | Dintakurti ............... E03B 7/003 |
| 2022/0190471 A1‡ | 6/2022 | Gibson ................... H01Q 21/28 |
| 2022/0291073 A1‡ | 9/2022 | Gibson .................... E03B 9/10 |
| 2022/0294104 A1‡ | 9/2022 | Ortiz ...................... H01Q 21/28 |
| 2022/0302580 A1‡ | 9/2022 | Ortiz ....................... H01Q 1/38 |
| 2022/0320721 A1‡ | 10/2022 | Gibson ................... H01Q 1/44 |
| 2023/0108605 A1 | 4/2023 | Hyland et al. |
| 2023/0184617 A1 | 6/2023 | Gibson et al. |
| 2023/0352825 A1 | 11/2023 | Ortiz et al. |
| 2024/0142331 A1 | 5/2024 | Sobhani et al. |

FOREIGN PATENT DOCUMENTS

| | | | |
|---|---|---|---|
| AU | 2017248541 | ‡ | 3/2019 |
| CA | 2154433 | ‡ | 1/1997 |
| CA | 2397174 | ‡ | 8/2008 |
| CA | 2634739 | ‡ | 6/2015 |
| CA | 3010333 | ‡ | 7/2020 |
| CA | 2766850 | ‡ | 8/2020 |
| CA | 3023529 | ‡ | 8/2020 |
| CA | 3070690 | ‡ | 11/2020 |
| CA | 2842042 | ‡ | 1/2021 |
| CA | 3057167 | ‡ | 3/2021 |
| CA | 3057202 | ‡ | 5/2021 |
| CA | 3060512 | ‡ | 6/2021 |
| CA | 3010345 | ‡ | 7/2021 |
| CA | 3095465 | ‡ | 9/2022 |
| CA | 3116787 | | 7/2023 |
| CA | 3113517 | | 8/2023 |
| CA | 3119150 | | 8/2023 |
| CA | 3102529 | | 9/2023 |
| CA | 3057224 | | 10/2023 |
| CA | 3105683 | | 10/2023 |
| CN | 1831478 | ‡ | 6/2013 |
| DE | 4211038 | ‡ | 11/1993 |
| DE | 19757581 | ‡ | 7/1998 |
| EP | 0711986 | ‡ | 5/1996 |
| EP | 1052492 | ‡ | 11/2000 |
| EP | 1077370 | ‡ | 2/2001 |
| EP | 1077371 | ‡ | 2/2001 |
| EP | 3293315 | ‡ | 3/2018 |
| EP | 3449062 | | 6/2023 |
| FR | 2439990 | ‡ | 5/1980 |
| FR | 2776065 | ‡ | 9/1999 |
| GB | 2250820 | ‡ | 6/1992 |
| GB | 2269900 | ‡ | 2/1994 |
| GB | 2367362 | ‡ | 4/2002 |
| GB | 2421311 | ‡ | 6/2006 |
| GB | 2550908 | ‡ | 12/2017 |
| JP | 59170739 | ‡ | 9/1984 |
| JP | 60111132 | ‡ | 6/1985 |
| JP | 08250777 | ‡ | 9/1996 |
| JP | H10-2744 | ‡ | 1/1998 |
| JP | 11201859 | ‡ | 7/1999 |
| JP | H11210028 | ‡ | 8/1999 |
| JP | 2000131179 | ‡ | 5/2000 |
| JP | 2002206965 | ‡ | 7/2002 |
| JP | 2002310840 | ‡ | 10/2002 |
| JP | 3595856 | ‡ | 12/2004 |
| JP | 2005315663 | ‡ | 11/2005 |
| JP | 2005321935 | ‡ | 11/2005 |
| JP | 2006062414 | ‡ | 3/2006 |
| JP | 2006062716 | ‡ | 3/2006 |
| JP | 2007047139 | ‡ | 2/2007 |
| JP | 2010068017 | ‡ | 3/2010 |

(56) References Cited

FOREIGN PATENT DOCUMENTS

| | | | |
|---|---|---|---|
| JP | 2013528732 | ‡ | 7/2013 |
| JP | H5654124 | ‡ | 11/2014 |
| KR | 101785664 | ‡ | 11/2017 |
| TW | 201117974 | | 6/2011 |
| WO | WO-9850771 | ‡ | 11/1998 |
| WO | WO-0151904 | ‡ | 7/2001 |
| WO | WO-03049528 | ‡ | 6/2003 |
| WO | WO-2004073115 | ‡ | 8/2004 |
| WO | WO-2005052573 | ‡ | 6/2005 |
| WO | WO-2008047159 | ‡ | 4/2008 |
| WO | WO-2009057214 | ‡ | 5/2009 |
| WO | WO-2010135587 | ‡ | 11/2010 |
| WO | WO-2011021039 | ‡ | 2/2011 |
| WO | WO-2011058561 | ‡ | 5/2011 |
| WO | WO-2011159403 | ‡ | 12/2011 |
| WO | WO-2012000088 | ‡ | 1/2012 |
| WO | WO-2012153147 | ‡ | 11/2012 |
| WO | WO-2013025526 | ‡ | 2/2013 |
| WO | WO-2014016625 | ‡ | 1/2014 |
| WO | WO-2017139029 | ‡ | 8/2017 |
| WO | WO-2017139030 | ‡ | 8/2017 |
| WO | WO-2020050946 | ‡ | 3/2020 |
| WO | WO-2021231163 | ‡ | 11/2021 |

OTHER PUBLICATIONS

US 11,309,624 B2, 04/2022, Gibson et al. (withdrawn)
US 11,378,481 B2, 07/2022, Gibson et al. (withdrawn)
US 11,378,482 B2, 07/2022, Gibson et al. (withdrawn)
US 11,404,772 B2, 08/2022, Ortiz et al. (withdrawn)
US 11,495,879 B2, 11/2022, Ortiz et al. (withdrawn)
US 11,554,278 B2, 01/2023, Hyland et al. (withdrawn)
US 11,621,483 B2, 04/2023, Ortiz et al. (withdrawn)
Hyland, Gregory E.; Australian Examination Report for serial No. 2015202550, filed May 5, 2011, mailed Feb. 9, 2017, 4 pgs.‡
Hyland, Gregory E.; Australian Examination Report for Serial No. 2015202550, filed May 5, 2011, mailed May 16, 2017, 5 pgs.‡
Hyland, Gregory E.; Australian Examination Report for Serial No. 2015202550, filed May 5, 2011, mailed Jul. 5, 2017, 4 pgs.‡
Hyland, Gregory E.; Australian Examination Report for serial No. 2015202550, filed May 5, 2011, mailed Aug. 12, 2016, 4 pgs.‡
Hyland, Gregory E.; Office Action for Mexico Patent Application No. MX/a/2017/006090, filed May 5, 2011, mailed Sep. 26, 2018, 4 pgs.‡
Hyland, Gregory E.; Examination Report for Australian patent application No. 2017248541, filed Oct. 20, 2017, mailed Apr. 20, 2018, 5 pgs.‡
Hyland, Gregory E.; Office Action for Canadian patent application No. 3,023,529, filed May 5, 2011, mailed Nov. 26, 2019, 4 pgs.‡
Keefe, Robert Paul, Office Action for Canadian application No. 3,060,512, filed May 5, 2011, mailed Apr. 22, 2020, 5 pgs.‡
Fleury, Leo W.; International Preliminary Report on Patentability for serial No. PCT/US12/50390 filed Aug. 10, 2012, mailed Feb. 18, 2014, 14 pgs.‡
Fleury, Leo W.; International Search Report and Written Opinion for serial No. PCT/US12/50390 filed Aug. 10, 2012, mailed Dec. 17, 2012, 18 pgs.‡
Fleury Jr., Leo W.; European Search Report for U.S. Appl. No. 12/823,594, filed Aug. 10, 2012, mailed Dec. 21, 2017, 4 pgs.‡
Fleury Jr., Leo W.; European Search Report for U.S. Appl. No. 12/823,594, filed Aug. 10, 2012, mailed May 10, 2017, 4 pgs.‡
Fleury Jr., Leo W.; European Search Report for U.S. Appl. No. 12/823,594, filed Aug. 10, 2012, mailed Jun. 8, 2015, 11 pgs.‡
Fleury, Leo W.; Office Action for Canadian application No. 2,842,042, filed Aug. 10, 2012, mailed Feb. 28, 2019, 3 pgs.‡
Fleury, Leo W.; Office Action for Canadian application No. 2,842,042, filed Aug. 10, 2012, mailed Apr. 24, 2018, 3 pgs.‡
Fleury, Leo W.; Office Action for Canadian patent application No. 2,842,042, filed Aug. 10, 2012, mailed Dec. 5, 82019, 3 pgs.‡

Hunaidi, Osama; Issue Notification for U.S. Appl. No. 11/766,288, filed Jun. 21, 2007, mailed Sep. 22, 2010, 1 pg.‡
Hunaidi, Osama; Non-Final Office Action for U.S. Appl. No. 11/766,288, filed Jun. 21, 2007, mailed Jan. 20, 2010, 50 pgs.‡
Hunaidi, Osama; Notice of Allowance for U.S. Appl. No. 11/766,288, filed Jun. 21, 2007, mailed Jun. 24, 2010, 8 pgs.‡
Hyland, Gregory E.; Mexico Office Action for serial No. MX/a/2012/000347, filed May 5, 2011, mailed Dec. 13, 2016, 5 pgs.‡
Hyland, Gregory E.; Mexico Office Action for serial No. MX/a/2012/000347, filed May 5, 2011, mailed May 30, 2016, 4 pgs.‡
Hyland, Gregory E.; Mexico Office Action for serial No. MX/a/2012/000347, filed May 5, 2011, mailed Aug. 31, 2016, 4 pgs.‡
Hyland, Gregory E.; Office Action for European patent application No. 11796120.1, filed May 5, 2011, mailed Feb. 9, 2018, 4 pgs.‡
Hyland, Gregory; Extended European Search Report for serial No. 11796120.1, filed May 5, 2011, mailed Nov. 4, 2016, 8 pgs.‡
Hyland, Gregory E.; Australian Patent Examination Report for serial No. 2011265675, filed Jan. 21, 2012, mailed Oct. 1, 2014, 3 pgs.‡
Hyland, Gregory E.; Japanese Office Action for serial No. 2013515338, filed Jan. 30, 2012, mailed Jun. 10, 2014, 8 pgs.‡
Hyland, Gregory E.; Japanese Office Action for serial No. 2014-234642, filed May 5, 2011, mailed Nov. 4, 2015,9 pgs.‡
Hyland, Gregory E.; Japanese Office Action for serial No. 2014-234642, filed May 5, 2011, mailed Jul. 7, 2015, 9 pgs.‡
Fleury, Jr., Leo W.; Notice of Allowance for U.S. Appl. No. 13/492,795, filed Jun. 8, 2012, mailed Sep. 21, 2016, 18 pgs.‡
Fleury, Jr., Leo W.; Supplemental Notice of Allowance for U.S. Appl. No. 13/492,795, filed Jun. 8, 2012, mailed Nov. 22, 2016; 8 pgs.‡
Fleury, Jr., Leo W.; Corrected Notice of Allowance for U.S. Appl. No. 15/401,457, filed Jan. 9, 2017, mailed Jun. 26, 2019, 55 pgs.‡
Fleury, Jr., Leo W.; Notice of Allowance for U.S. Appl. No. 15/401,457, filed Jan. 9, 2017, mailed Apr. 16, 2019, 88 pgs.‡
Hyland; International Preliminary Report on Patentability for serial No. PCT/US2011/035374, filed May 5, 2011, mailed Dec. 19, 2012; 5 pgs.‡
Hyland; International Search Report and Written Opinion for serial No. PCT/US2011/035374, filed May 5, 2011, mailed Sep. 13, 2011; 7 pgs.‡
Hyland, Gregory E..; Office Action for Canadian Patent Application No. 2,766,850, filed May 5, 2011, mailed Mar. 13, 2017, 4 pgs.‡
Hyland, Gregory E.; Office Action for Canadian application No. 2,766,850, filed May 5, 2011, mailed Aug. 16, 2018, 4 pgs.‡
Hyland, Gregory E.; Office Action for Canadian patent application No. 2,766,850, filed May 5, 2011, mailed Jun. 19, 2019, 4 pgs.‡
Gibson, Daryl Lee; International Preliminary Report on Patentability for PCT Application No. PCT/US2016/067692, filed Dec. 20, 2016, mailed Aug. 23, 2018, 9 pgs.‡
Gibson, Daryl Lee; International Search Report and Written Opinion for PCT Application No. PCT/US2016/067692, filed Dec. 20, 2016, mailed Mar. 2, 2017,10 pgs.‡
Gibson, Daryl Lee; Extended European Search Report for 16890115.5, filed Dec. 20, 2016, mailed Jan. 24, 2020, 10 pgs.‡
Gibson, Daryl Lee; Office Action for Canadian patent application No. 3,010,345, filed Dec. 20, 2016, mailed Dec. 16, 2019, 4 pgs.‡
Gibson, Daryl Lee; International Search Report and Written Opinion for PCT Application No. PCT/US19/45451, filed Aug. 7, 2019, mailed Feb. 3, 2020, 11 pgs.‡
Gibson, Daryl Lee; Invitation to Pay Additional Fees for PCT/US19/45451, filed Aug. 7, 2019, mailed Oct. 10, 2019, 2 pgs.‡
Gibson, Daryl Lee; Office Action for Canadian patent application No. 3,057,167, filed Aug. 7, 2019, mailed Nov. 19, 2019, 7 pgs.‡
Gibson, Daryl Lee; Office Action for Canadian patent application No. 3,057,167, filed Aug. 7, 2019, mailed May 25, 2020, 3 pgs.‡
Gibson, Daryl Lee; Office Action for Canadian application No. 3,057,202, filed Oct. 1, 2019, mailed Dec. 19, 2019, 3 pgs.‡
Gibson, Daryl Lee; Office Action for Canadian application No. 3,057,202, filed Oct. 1, 2019, mailed Apr. 2, 2020, 4 pgs.‡
Hyland, Gregory E.; Issue Notification for U.S. Appl. No. 14/848,676, filed Sep. 9, 2015, mailed Dec. 6, 2017, 1 pg.‡

(56) References Cited

OTHER PUBLICATIONS

Antenna. Merriam-Webster Dictionary, 2014 [retrieved on Jun. 1, 2014]. Retrieved from the Internet: <URL: www.merriam-webster.com/dictionary/antenna>.‡
Fleury, et al.; Supplemental European Search Report for application No. 12823594.2, filed Aug. 20, 2012, mailed Feb. 18, 2015, 6 pgs.‡
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.‡
Non-Patent Literature "Radiodetection Water Leak Detection Products", 2008, Radiodetection Ltd.—SPX Corporation.‡
Non-Patent Literature Bimorph (entitled "Bimoprh actuators"), accessed at http://web.archive.org/web/20080122050424/http://www.elpapiezo.ru/eng/curve_e.shtml, archived on Jan. 22, 2008.‡
Non-Patent Literature Murata (entitled "Piezoelectric Sounds Components"), accessed at http://web.archive.org/web/20030806141815/http://www.murata.com/catalog/p37e17.pdf, archived on Aug. 6, 2003.‡
Non-Patent Literature NerdKits, accessed at http://web.archive.org/web/20090510051850/http://www.nerdkits.com/videos/sound_meter/, archived on May 10, 2009.‡
Ortiz, Jorge Isaac; Supplemental Notice of Allowance for U.S. Appl. No. 15/043,057, filed Feb. 12, 2016, mailed Mar. 13, 2019, 6 pgs.‡
Ortiz, Jorge Isaac; Extended European Search Report for serial No. 16890114.8, filed Dec. 20, 2016, mailed Sep. 26, 2019, 11 pgs.‡
Ortiz, Jorge Isaac; Office Action for Canadian patent application No. 3,010,333, filed Dec. 20, 2016, mailed Dec. 6, 2019, 4 pgs.‡
Oritz, Jorge Isaac; Office Action for Canadian patent application No. 3,070,690, filed Dec. 20, 2016, mailed Mar. 10, 2020, 3 pgs.‡
Gibson, Daryl Lee; Corrected Notice of Allowance for U.S. Appl. No. 15/255,795, filed Sep. 2, 2016, mailed Mar. 21, 2019, 6 pgs.‡
Gibson, Daryl Lee; Final Office Action for U.S. Appl. No. 15/255,795, filed Sep. 2, 2016, mailed Aug. 31, 2018, 33 pgs.‡
Gibson, Daryl Lee; Non-Final Office Action for U.S. Appl. No. 15/255,795, filed Sep. 2, 2016, mailed Feb. 23, 2018, 86 pgs.‡
Gibson, Daryl Lee; Notice of Allowance for U.S. Appl. No. 15/255,795, filed Sep. 2, 2016, mailed Jan. 17, 2019, 17 pgs.‡
Gibson, Daryl Lee; Non-Final Office Action for U.S. Appl. No. 16/121,136, filed Sep. 4, 2018, mailed Jun. 22, 2020, 94 pgs.‡
Gibson, Daryl Lee; Requirement for Restriction/Election for U.S. Appl. No. 16/121,136, filed Sep. 14, 2018, mailed May 7, 2020, 5 pgs.‡
Hunaidi, Osama; Non-final Office Action for U.S. Appl. No. 09/482,317, filed Jan. 14, 2000, mailed Dec. 17, 2001, 6 pgs.‡
Hunaidi, Osama; Notice of Allowance for U.S. Appl. No. 09/482,317, filed Jan. 14, 2000, mailed May 13, 2002, 4 pgs.‡
Peter, Russo Anthony; European Search Report for Patent Application No. EP95307807, filed Nov. 1, 1995, mailed Jul. 22, 1998, 5 pgs.‡
Ortiz, Jorge Isaac; Final Office Action for U.S. Appl. No. 15/043,057, filed Feb. 12, 2016, mailed Dec. 12, 2018, 25 pgs.‡
Ortiz, Jorge Isaac; Issue Notification for U.S. Appl. No. 15/043,057, filed Feb. 12, 2016, mailed Apr. 17, 2019, 1 pg.‡
Ortiz, Jorge Isaac; Non-Final Office Action for U.S. Appl. No. 15/043,057, filed Feb. 12, 2016, mailed Jun. 4, 2018, 94 pgs.‡
Ortiz, Jorge Isaac; Notice of Allowance for U.S. Appl. No. 15/043,057, filed Feb. 12, 2016, mailed Feb. 19, 2019, 8 pgs.‡
Ortiz, Jorge Isaac; International Preliminary Report on Patentability for PCT Application No. PCT/US2016/067689, filed Dec. 20, 2016, mailed Aug. 23, 2018, 8 pgs.‡
Richarz, Werner Guenther; Non-Final Office Action for U.S. Appl. No. 13/492,792, filed Jun. 8, 2012, mailed Jun. 4, 2014, 24 pgs.‡
Ortiz, Jorge; International Search Report and Written Opinion for PCT/US16/67689, filed Dec. 20, 2016, mailed Mar. 8, 2017, 9 pgs.‡
Richarz, Werner Guenther; Non-Final Office Action for U.S. Appl. No. 13/492,792, filed Jun. 8, 2012, mailed Feb. 27, 2015, 15 pgs.‡
Richarz, Werner Guenther; Final Office Action for U.S. Appl. No. 13/492,792, filed Jun. 8, 2012, mailed Sep. 10, 2015, 20 pgs.‡
Richarz, Werner Guenther; Final Office Action for U.S. Appl. No. 13/492,792, filed Jun. 8, 2012, mailed Sep. 8, 2016, 36 pgs.‡
Richarz, Werner Guenther; Non-Final Office Action for U.S. Appl. No. 13/492,792, filed Jun. 8, 2012, mailed Mar. 8, 2016, 27 pgs.‡
Richarz, Werner Guenther; Notice of Allowance for U.S. Appl. No. 13/492,792, filed Jun. 8, 2012, mailed Jun. 13, 2017, 31 pgs.‡
Richarz, Werner Guenther; Restriction Requirement for U.S. Appl. No. 13/492,792, filed Jun. 8, 2012, mailed Sep. 27, 2013; 5 pgs.‡
Chou, et al.; Article entitled: "Non-invasive Acceleration-based Methodology for Damage Detection and Assessment of Water Distribution System", Mar. 2010, 17 pgs.‡
Dintakurti, Ganapathi Deva Varma; Corrected Notice of Allowance for U.S. Appl. No. 13/492,794, filed Jun. 8, 2012, mailed Dec. 6, 2018, 6 pgs.‡
Fleury, Leo W.; Final Office Action for U.S. Appl. No. 14/870,070, filed Sep. 30, 2015, mailed Dec. 29, 2017, 24 pgs.‡
Fleury, Leo; Non-Final Office Action for U.S. Appl. No. 14/870,070, filed Sep. 30, 2015, mailed Jun. 21, 2017, 88 pgs.‡
Hyland, Gregory E.; Supplemental Notice of Allowability for U.S. Appl. No. 14/848,676, filed Sep. 9, 2015, mailed Sep. 19, 2017, 8 pgs.‡
Hyland, Gregory E.; Final Office Action for U.S. Appl. No. 14/848,676, filed Sep. 9, 2015, mailed Aug. 19, 2016; 20 pgs.‡
Hyland, Gregory; Final Office Action for U.S. Appl. No. 14/848,676, filed Sep. 9, 2015, mailed Jun. 7, 2017, 25 pgs.‡
Hyland, Gregory; Non-Final Office Action for U.S. Appl. No. 14/848,676, filed Sep. 9, 2015, mailed Mar. 4, 2016, 94 pgs.‡
Hyland, Gregory E.; Final Office Action for U.S. Appl. No. 15/817,172, filed Nov. 18, 2017, mailed Jun. 11, 2020, 33 pgs.‡
Hyland, Gregory E.; Non-Final Office Action for U.S. Appl. No. 15/817,172, filed Nov. 18, 2017, mailed Dec. 17, 2019, 23 pgs.‡
Fleury, Jr., Leo W.; Final Office Action for U.S. Appl. No. 15/939,942, filed Mar. 29, 2018, mailed Feb. 19, 2020, 29 pgs.‡
Hyland, Gregory E.; Non-Final Office Action for U.S. Appl. No. 15/817,172, filed Nov. 18, 2017, mailed Jul. 10, 2019, 74 pgs.‡
Fleury, Jr., Leo W.; Non-Final Office Action for U.S. Appl. No. 15/939,942, filed Mar. 29, 2018, mailed May 27, 2020, 23 pgs.‡
Hyland, Gregory E.; Final Office Action for U.S. Appl. No. 16/675,507, filed Nov. 6, 2019, mailed Jun. 26, 2020, 70 pgs.‡
Fleury, Jr., Leo W.; Non-Final Office Action for U.S. Appl. No. 15/939,942, filed Mar. 29, 2018, mailed Sep. 25, 2019, 92 pgs.‡
Hyland, Gregory E.; Non-Final Office Action for U.S. Appl. No. 16/675,507, filed Nov. 6, 2019, mailed Jan. 28, 2020, 18 pgs.‡
Richarz, Werner Guenther; Corrected Notice of Allowability for U.S. Appl. No. 13/492,792, filed Jun. 8, 2012, mailed Aug. 29, 2017, 6 pgs.‡
Richarz, Werner Guenther; Final Office Action for U.S. Appl. No. 13/492,792, filed Jun. 8, 2012, mailed Oct. 20, 2014, 17 pgs.‡
Richarz, Werner Guenther; Issue Notification for U.S. Appl. No. 13/492,792, filed Jun. 8, 2012, mailed Sep. 6, 2017, 1 pg.‡
Richarz, Werner Guenther; Non-Final Office Action for U.S. Appl. No. 13/492,792, filed Jun. 8, 2012, mailed Nov. 6, 2013, 39 pgs.‡
Fleury Jr., Leo W.; Non-Final Office Action for U.S. Appl. No. 13/492,790, filed Jun. 8, 2012, mailed Nov. 5, 2014, 30 pgs.‡
Fleury, Jr., Leo W.; Advisory Action for U.S. Appl. No. 13/492,790, filed Jun. 8, 2012, mailed Jul. 9, 2014, 3 pgs.‡
Fleury Jr, Leo W.; Non-Final Office Action for U.S. Appl. No. 13/492,795, filed Jun. 8, 2012, mailed Sep. 23, 2013; 35 pgs.‡
Fleury, Jr., Leo W.; Final Office Action for U.S. Appl. No. 13/492,790, filed Jun. 8, 2012, mailed Mar. 12, 2014; 19 pgs.‡
Fleury, Jr., Leo W.; Advisory Action for U.S. Appl. No. 13/492,795, filed Jun. 8, 2012, mailed Jun. 18, 2014, 4 pgs.‡
Fleury, Jr., Leo W.; Issue Notification for U.S. Appl. No. 13/492,790, filed Jun. 8, 2012, mailed Mar. 2, 2016, 1 pg.‡
Fleury, Jr., Leo W.; Advisory Action for U.S. Appl. No. 13/492,795, filed Jun. 8, 2012, mailed Sep. 9, 2015, 3 pgs.‡
Fleury, Jr., Leo W.; Non-Final Office Action for U.S. Appl. No. 13/492,790, filed Jun. 8, 2012, mailed Sep. 12, 2013; 37 pgs.‡
Fleury, Jr., Leo W.; Corrected Notice of Allowability for U.S. Appl. No. 13/492,795, filed Jun. 8, 2012, mailed Feb. 14, 2017; 8 pgs.‡
Fleury, Jr., Leo W.; Notice of Allowance for U.S. Appl. No. 13/492,790, filed Jun. 8, 2012, mailed Feb. 2, 2016, 9 pgs.‡
Fleury, Jr., Leo W.; Final Office Action for U.S. Appl. No. 13/492,795, filed Jun. 8, 2012, mailed Apr. 23, 2014, 19 pgs.‡

(56) References Cited

OTHER PUBLICATIONS

Fleury, Jr., Leo W.; Notice of Allowance for U.S. Appl. No. 13/492,790, filed Jun. 8, 2012, mailed May 12, 2015, 9 pgs.‡
Fleury, Jr., Leo W.; Final Office Action for U.S. Appl. No. 13/492,795, filed Jun. 8, 2012, mailed May 22, 2015, 28 pgs.‡
Fleury, Jr., Leo W.; Notice of Allowance for U.S. Appl. No. 13/492,790, filed Jun. 8, 2012, mailed Sep. 23, 2015, 11 pgs.‡
Fleury, Jr., Leo W.; Issue Notification for U.S. Appl. No. 13/492,795, filed Jun. 8, 2012, mailed Feb. 22, 2017; 1 page.‡
Fleury, Leo W.; Applicant-Initiated Interview Summary for U.S. Appl. No. 14/870,070, filed Sep. 30, 2015, mailed Feb. 28, 2018, 4 pgs.‡
Fleury, Jr., Leo W.; Non-Final Office Action for U.S. Appl. No. 13/492,795, filed Jun. 8, 2012, mailed Oct. 21, 2014, 37 pgs.‡
Hyland, Gregory E.; Notice of Allowance for U.S. Appl. No. 14/557,754, filed Dec. 2, 2014, mailed Jul. 17, 2017, 14 pgs.‡
Fleury, Jr., Leo W.; Non-Final Office Action for U.S. Appl. No. 13/492,795, filed Jun. 8, 2012, mailed Mar. 1, 2016, 42 pgs.‡
Hyland, Gregory E.; Notice of Decision from Post-Prosecution Pilot Program (P3) Conference for U.S. Appl. No. 14/557,754, filed Dec. 2, 2014, mailed Sep. 14, 2016, 4 pgs.‡
Fleury, Jr., Leo W.; Notice of Allowability for U.S. Appl. No. 13/492,795, filed Jun. 8, 2012, mailed Oct. 24, 2016, 13 pgs.‡
Hyland, Gregory E.; Supplemental Notice of Allowability for U.S. Appl. No. 14/557,754, filed Dec. 2, 2014, mailed Oct. 20, 2017, 11 pgs.‡
Hyland, Gregory; Issue Notification for U.S. Appl. No. 14/557,754, filed Dec. 2, 2014, mailed Dec. 20, 2017, 1 pg.‡
Hyland, Gregory E.; Final Office Action for U.S. Appl. No. 14/557,754, filed Dec. 2, 2014, mailed Apr. 5, 2017, 23 pgs.‡
Hyland, Gregory E.; Non-Final Office Action for U.S. Appl. No. 14/557,754, filed Dec. 2, 2014, mailed Nov. 8, 2016, 48 pgs.‡
Hyland, Gregory E.; Non-Final Office Action for U.S. Appl. No. 14/848,676, filed Sep. 9, 2015, mailed Dec. 13, 2016, 52 pgs.‡
Hyland, Gregory E.; Notice of Allowance for U.S. Appl. No. 14/848,676, filed Sep. 9, 2015, mailed Sep. 6, 2017, 12 pgs.‡
Dintakurti, Ganapathi Deva Varma; Final Office Action for U.S. Appl. No. 13/492,794, filed Jun. 8, 2012, mailed Oct. 18, 2017, 38 pgs.‡
Hyland, Gregory E.; Supplemental Notice of Allowability for U.S. Appl. No. 14/848,676, filed Sep. 9, 2015, mailed Nov. 27, 2017, 6 pgs.‡
Dintakurti, Ganapathi Deva Varma; Final Office Action for U.S. Appl. No. 13/492,794, filed Jun. 8, 2012, mailed Nov. 8, 2016, 31 pgs.‡
Dintakurti, Ganapathi Deva Varma; Final Office Action for U.S. Appl. No. 13/492,794, filed Jun. 8, 2012, mailed Jun. 22, 2018, 39 pgs.‡
Dintakurti, Ganapathi Deva Varma; Issue Notification for U.S. Appl. No. 13/492,794, filed Jun. 8, 2012, mailed Dec. 19, 2018, 1 pg.‡
Dintakurti, Ganapathi Deva Varma; Non-Final Office Action for U.S. Appl. No. 13/492,794, filed Jun. 8, 2012, mailed Mar. 16, 2017, 30 pgs.‡
Dintakurti, Ganapathi Deva Varma; Non-Final Office Action for U.S. Appl. No. 13/492,794, filed Jun. 8, 2012, mailed May 17, 2016, 48 pgs.‡
Dintakurti, Ganapathi Deva Varma; Non-Final Office Action for U.S. Appl. No. 13/492,794, filed Jun. 8, 2012, mailed Jan. 11, 2018, 38 pgs.‡
Hyland, Gregory E., Non-Final Office Action for U.S. Appl. No. 13/101,235, filed May 5, 2011, mailed Jul. 31, 2013; 57 pgs.‡
Dintakurti, Ganapathi Deva Varma; Non-Final Office Action for U.S. Appl. No. 13/492,794, filed Jun. 8, 2012, mailed Jan. 16, 2015, 60 pgs.‡
Hyland, Gregory E.; Final Office Action for U.S. Appl. No. 13/101,235, filed May 5, 2011, mailed Feb. 20, 2014; 29 pgs.‡
Dintakurti, Ganapathi Deva Varma; Notice of Allowance for U.S. Appl. No. 13/492,794, filed Jun. 8, 2012, mailed Sep. 24, 2018, 21 pgs.‡
Hyland, Gregory E.; Issue Notification for U.S. Appl. No. 13/101,235, filed May 5, 2011, mailed Dec. 23, 2014, 1 pg.‡
Hyland, Gregory E.; Non-Final Office Action for U.S. Appl. No. 13/101,235, filed May 5, 2011, mailed Jun. 5, 2014, 29 pgs.‡
Hyland, Gregory E.; Notice of Allowance for U.S. Appl. No. 13/101,235, filed May 5, 2011, mailed Sep. 11, 2014, 11 pgs.‡
Hyland, Gregory E.; Supplemental Notice of Allowability for U.S. Appl. No. 13/101,235, filed May 5, 2011, mailed Nov. 25, 2014, 5 pgs.‡
Hyland, Gregory E.; Final Office Action for U.S. Appl. No. 14/557,754, filed Dec. 2, 2014, mailed Jun. 30, 2016, 24 pgs.‡
Hyland, Gregory E.; Applicant-Initiated Interview Summary for U.S. Appl. No. 14/557,754, filed Dec. 2, 2014, mailed Apr. 19, 2017, 4 pgs.‡
Hyland, Gregory E.; Non-Final Office Action for U.S. Appl. No. 14/557,754, filed Dec. 2, 2014, mailed Jan. 19, 2016, 101 pgs.‡
Gibson, Daryl Lee; Final Office Action for U.S. Appl. No. 17/079,642, filed Oct. 26, 2020, mailed Dec. 14, 2021, 17 pgs.‡
Gibson, Daryl Lee; Notice of Allowance for U.S. Appl. No. 16/234,715, filed Dec. 28, 2018, mailed Dec. 7, 2021, 23 pgs.‡
Gibson, Daryl Lee; Final Office Action for U.S. Appl. No. 17/245,419, filed Apr. 30, 2021, mailed Oct. 25, 2021, 27 pgs.‡
Gibson, Daryl Lee; Applicant-Initiated Interview Summary for U.S. Appl. No. 17/245,419, filed Apr. 30, 2021, mailed Dec. 2, 2021, 2 pgs.‡
Ortiz, Jorge Isaac; Office Action for Canadian patent application No. 3,095,465, filed Dec. 20, 2016, mailed Nov. 8, 2021, 4 pgs.‡
Gibson, Daryl Lee; Notice of Allowance for U.S. Appl. No. 16/352,045, filed Mar. 13, 2019, mailed Dec. 1, 2021, 24 pgs.‡
Ortiz, Jorge Isaac; Final Office Action for U.S. Appl. No. 17/245,181, filed Apr. 30, 2021, mailed Dec. 7, 2021, 28 pgs.‡
Fleury Jr., Leo W., Advisory Action for U.S. Appl. No. 15/939,942, filed Mar. 29, 2018, mailed Dec. 7, 2021, 2 pgs.‡
Non-Patent Literature "Radiodetection Water Leak Detection Products", 2008, Radiodetection Ltd.—SPX Corporation, 16 pgs.‡
"Non-Patent Literature Murata (entitled ""Piezoelectric Sounds Components""), accessed at http://web.archive.org/web/20030806141815/http://www.murata.com/catalog/p37e17.pdf, archived on Aug. 6, 2003.", 39 pgs.‡
"Non-Patent Literature NerdKits, accessed at http://web.archive.org/web/20090510051850/http://www.nerdkits.com/videos/sound_meter/, archived on May 10, 2009.", 6 pgs.‡
"Non-Patent Literature Bimorph (entitled ""Bimoprh actuators""), accessed at http://web.archive.org/web/20080122050424/http://www.elpapiezo.ru/eng/curve_e.shtml, archived on Jan. 22, 2008.", 3 pgs.‡
Antenna. Merriam-Webster Dictionary, 2014 [retrieved on Jun. 1, 2014]. Retrieved from the Internet: <URL: www.merriam-webster.com/dictionary/antenna>, 1 pg.‡
Gibson, Daryl Lee; International Preliminary Report on Patentability for PCT Application No. PCT/US19/45451, filed Aug. 7, 2019, mailed Mar. 18, 2021, 8 pgs.‡
Gibson, Daryl Lee; Non-Final Office Action for U.S. Appl. No. 16/234,715, filed Dec. 28, 2018, mailed Jan. 1, 2021, 105 pgs.‡
Ortiz, Jorge Isaac, Notice of Allowance for U.S. Appl. No. 16/354,939, filed Mar. 15, 2019, mailed Jun. 9, 2022, 10 pgs.‡
Gibson, Daryl Lee; Non-Final Office Action for U.S. Appl. No. 17/245,419, filed Apr. 30, 2021, mailed Jul. 20, 2022, 37 pgs.‡
Hyland, Gregory E.; Notice of Allowance for U.S. Appl. No. 17/071,632, filed Oct. 15, 2020, mailed Jun. 24, 2022, 11 pgs.‡
Gibson, Daryl Lee; Final Office Action for U.S. Appl. No. 16/352,045, filed Mar. 13, 2019, mailed May 4, 2021, 33 pgs.‡
Fleury, Jr., Leo W.; Non-Final Office Action for U.S. Appl. No. 15/939,942, filed Mar. 29, 2018, mailed Mar. 24, 2021, 32 pgs.‡
Fleury, Leo W.; Office Action for Canadian patent application No. 2,842,042, filed Aug. 10, 2012, mailed Dec. 5, 2019, 3 pgs.‡
Gibson, Daryl Lee; Non-Final Office Action for U.S. Appl. No. 16/428,744, filed May 31, 2019, mailed Aug. 2, 2021, 121 pgs.‡
ABT, Inc., Installation Instructions Belleville Washer springs (Year: 2014), 1 pg.‡
Speacialinsert, Inserts for plastic (Year: 2016), 36 pgs.‡
Gibson, Daryl Lee; Invitation to Pay Additional Fees for PCT/US21/31033, filed May 6, 2021, mailed Jul. 15, 2021, 2 pgs.‡

(56) References Cited

OTHER PUBLICATIONS

QRFS, Storz FDCs and fire Hydrant Storz connections: Adapters or integral Storz, Mar. 2019 (Year: 2019), 21 pgs.‡
Gibson, Daryl Lee; Non-Final Office Action for U.S. Appl. No. 16/352,045, filed Mar. 13, 2019, mailed Aug. 13, 2021, 20 pgs.‡
Gibson, Daryl Lee; Final Office Action for U.S. Appl. No. 16/234,715, filed Dec. 28, 2018, mailed Aug. 5, 2021, 21 pgs.‡
Ortiz, Jorge Isaac; Requirement for Restriction/Election for U.S. Appl. No. 17/245,181, filed Apr. 30, 2021, mailed Jul. 22, 2021, 6 pgs.‡
Ortiz, Jorge Isaac; Non-Final Office Action for U.S. Appl. No. 16/354,939, filed Mar. 15, 2019, mailed Aug. 10, 2021, 126 pgs.‡
Gibson, Daryl Lee; Non-Final Office Action for U.S. Appl. No. 17/245,419, filed Apr. 30, 2021, mailed Jan. 14, 2022, 27 pgs.‡
Gibson, Daryl Lee; Applicant-Initiated Interview Summary for U.S. Appl. No. 17/079,642, filed Oct. 26, 2020, mailed Feb. 9, 2022, 2 pgs.‡
Gibson, Daryl Lee; Notice of Allowance for U.S. Appl. No. 17/245,419, filed Apr. 30, 2021, mailed Nov. 4, 2022, 22 pgs.‡
Gibson, Daryl Lee; Requirement for Restriction/Election for U.S. Appl. No. 17/683,090, filed Feb. 28, 2022, mailed Nov. 9, 2022, 5 pgs.‡
Gibson, Daryl Lee; International Preliminary Report on Patentability for PCT Application No. PCT/US21/31033, filed May 6, 2021, mailed Nov. 24, 2022, 9 pgs.‡
Gibson, Daryl Lee; Supplementary Examination Written Opinion for Singapore patent application No. 11202101803V, filed Jul. 8, 2019, mailed Nov. 2, 2022, 4 pgs.‡
Ortiz, Jorge Isaac; Non-Final Office Action for U.S. Appl. No. 17/833,230, filed Jun. 6, 2022, mailed Oct. 25, 2022, 98 pgs.‡
Ortiz, Jorge Isaac; Non-Final Office Action for U.S. Appl. No. 17/829,759, filed Jun. 1, 2022, mailed Oct. 24, 2022, 92 pgs.‡
Fleury Jr., Leo W.; Notice of Allowance for U.S. Appl. No. 16/453,318, filed Jun. 26, 2019, mailed Oct. 25, 2022, 43 pgs.‡
Fleury, Leo W., Jr.; Office Action for Canadian patent application No. 3,102,529, filed Aug. 10, 2012, mailed Oct. 25, 2022, 4 pgs.‡
Gibson, Daryl Lee; Notice of Allowance for U.S. Appl. No. 16/428,744, filed May 31, 2019, mailed Mar. 16, 2022, 34 pgs.‡
Fleury, Leo W., Jr.; Office Action for Canadian patent application No. 3,102,529, filed Aug. 10, 2012, mailed Mar. 16, 2022, 4 pgs.‡
Gibson, Daryl Lee; Applicant-Initiated Interview Summary for U.S. Appl. No. 17/245,419, filed Apr. 30, 2021, mailed Mar. 8, 2022, 2 pgs.‡
Gibson, Daryl Lee; Notice of Allowance for U.S. Appl. No. 17/079,642, filed Oct. 26, 2020, mailed Mar. 1, 2022, 11 pgs.‡
Gibson, Daryl Lee; Office Action for Canadian patent application No. 3,105,683, filed Aug. 7, 2019, mailed Mar. 8, 2022, 4 pgs.‡
Gibson, Daryl Lee; Extended European Search Report for application No. 19857477.4, filed Aug. 7, 2019, mailed Apr. 5, 2022, 7 pgs.‡
Gibson, Daryl Lee; Final Office Action for U.S. Appl. No. 17/245,419, filed Apr. 30, 2021, mailed Apr. 8, 2022, 31 pgs.‡
Ortiz, Jorge Isaac; Notice of Allowance for U.S. Appl. No. 17/245,181, filed Apr. 30, 2021, mailed Mar. 7, 2022, 13 pgs.‡
Ortiz, Jorge Isaac; Final Office Action for U.S. Appl. No. 16/354,939, filed Mar. 15, 2019, mailed Mar. 17, 2022, 40 pgs.‡
Fleury, Jr.; Non-Final Office Action for U.S. Appl. No. 16/453,318, filed Jun. 26, 2019, mailed Mar. 2, 2022, 129 pgs.‡
Hyland, Gregory E.; Non-Final Office Action for U.S. Appl. No. 17/071,632, filed Oct. 15, 2020, mailed Mar. 30, 2022, 89 pgs.‡
Gibson, Daryl Lee; Non-Final Office Action for U.S. Appl. No. 17/245,419, filed Apr. 30, 2021, mailed Sep. 2, 2021, 82 pgs.‡
Gibson, Daryl; Office Action for U.S. Patent application No. 3,057,224, filed Oct. 1, 2019, mailed Jun. 23, 2021, 4 pgs.‡
Gibson, Daryl Lee; Non-Final Office Action for U.S. Appl. No. 17/079,642, filed Oct. 26, 2020, mailed Aug. 30, 2021, 84 pgs.‡
Fleury Jr., Leo W.; Final Office Action for U.S. Appl. No. 15/939,942, filed Mar. 29, 2018, mailed Aug. 27, 2021, 30 pgs.‡
Ortiz, Jorge Isaac; Notice of Allowance for U.S. Appl. No. 17/245,181, filed Apr. 30, 2021, mailed Sep. 19, 2022, 11 pgs.‡

Gibson, Daryl Lee; Office Action for Canadian patent application No. 3,119,150, filed Dec. 20, 2016, mailed Sep. 15, 2022, 6 pgs.‡
Gibson, Daryl Lee; Notice of Allowance for U.S. Appl. No. 16/428,744, filed May 31, 2019, mailed Sep. 14, 2022, 12 pgs.‡
Hyland, Gregory E.; Office Action for Canadian patent application No. 3,116,787, filed Apr. 29, 2020, mailed Aug. 15, 2022, 4 pgs.‡
Hyland, Gregory E.; Notice of Allowance for U.S. Appl. No. 17/071,632, filed Oct. 15, 2020, mailed Aug. 29, 2022, 10 pgs.‡
Ortiz, Jorge Isaac; Notice of Allowance for U.S. Appl. No. 16/354,939, filed Mar. 15, 2019, mailed Sep. 2, 2022, 9 pgs.‡
Gibson, Daryl Lee; Corrected Notice of Allowance for U.S. Appl. No. 16/121,136, filed Sep. 4, 2018, mailed Nov. 9, 2020, 6 pgs.‡
Gibson, Daryl Lee; Office Action for Canadian application No. 3,057,202, filed Oct. 1, 2019, mailed Aug. 31, 2020, 4 pgs.‡
Gibson, Daryl Lee; Office Action for Canadian patent application No. 3,057,224, filed Oct. 1, 2019, mailed Nov. 10, 2020, 4 pgs.‡
Keefe, Robert Paul, Office Action for Canadian application No. 3,060,512, filed May 5, 2011, mailed Jul. 13, 2020, 6 pgs.‡
Hyland, Gregory E.; Supplemental Notice of Allowance for U.S. Appl. No. 16/675,507, filed Nov. 6, 2019, mailed Nov. 10, 2020, 4 pgs.‡
Hyland, Gregory; Supplemental Notice of Allowance for U.S. Appl. No. 15/817,172, filed Nov. 18, 2017, mailed Oct. 9, 2020, 4 pgs.‡
Gibson, Daryl Lee; Notice of Allowance for U.S. Appl. No. 16/121,136, filed Sep. 4, 2018, mailed Sep. 29, 2020, 15 pgs.‡
Hyland, Gregory E.; Notice of Allowance for U.S. Appl. No. 16/675,507, filed Nov. 6, 2019, mailed Oct. 23, 2020, 16 pgs.‡
Hyland, Gregory E.; Supplemental Notice of Allowance for U.S. Appl. No. 15/817,172, filed Nov. 18, 2017, mailed Oct. 28, 2020, 4 pgs.‡
Hyland, Gregory E.; Notice of Allowance for U.S. Appl. No. 15/817,172, filed Nov. 18, 2017, mailed Aug. 21, 2020, 9 pgs.‡
Gibson, Daryl Lee; Non-Final Office Action for U.S. Appl. No. 16/352,045, filed Mar. 13, 2019, mailed Nov. 25, 2020, 106 pgs.‡
Gibson, Daryl Lee; Office Action for Canadian patent application No. 3,010,345, filed Dec. 20, 2016, mailed Oct. 6, 2020, 4 pgs.‡
Fleury, Jr., Leo W.; Final Office Action for U.S. Appl. No. 15/939,942, filed Mar. 29, 2018, mailed Nov. 25, 2020, 37 pgs.‡
Hyland, Gregory E.; Supplemental Notice of Allowance for U.S. Appl. No. 15/817,172, filed Nov. 18, 2017, mailed Dec. 7, 2020, 4 pgs.‡
Gibson, Daryl Lee; Applicant-Initiated Interview Summary for U.S. Appl. No. 16/234,715, filed Dec. 28, 2018, mailed Oct. 14, 2021, 2 pgs.‡
Gibson, Daryl Lee; International Search Report and Written Opinion for PCT Application No. PCT/US21/31033, filed May 6, 2021, mailed Sep. 24, 2021, 12 pgs.‡
Gibson, Daryl Lee; Extended European Search Report for application No. 21180958.7, filed Aug. 7, 2019, mailed Oct. 5, 2021, 8 pgs.‡
Ortiz, Jorge Isaac; Office Action for European patent application No. 16890114.8, filed Dec. 20, 2016, mailed Oct. 4, 2021, 7 pgs.‡
Ortiz, Jorge Isaac; Non-Final Office Action for U.S. Appl. No. 17/245,181, filed Apr. 30, 2021, mailed Sep. 16, 2021, 82 pgs.‡
Wallace & Tiernan; Brochure for Hydraclam Distribution Water Quality Monitoring SB.50.700GE, Allegedly Available as Early as 2008, 8 pgs.‡
Gibson, Daryl Lee; Office Action for Canadian patent application No. 3,113,517, filed Oct. 1, 2019, mailed Jul. 8, 2022, 5 pgs.‡
Wallace & Tiernan; Product Sheet for Wallace & Tiernan Analysers and Controllers—HydraClam Water Quality Monitor with Remote Communications, Allegedly Available as Early as 2008, 4 pgs.‡
Sansei Denki KK; Translation for JP3595856(B2), published on Dec. 2, 2004, 12 pgs.‡
Wallace & Tiernan; Brochure for Hydraclam continuous water quality monitoring via hydrants, Allegedly Available as Early as 2008, 3 pgs.‡
Fleury Jr., Leo W.; Final Office Action for U.S. Appl. No. 16/453,318, filed Jun. 26, 2019, mailed Aug. 8, 2022, 53 pgs.‡
Ortiz, Jorge Isaac; Office Action for European patent application No. 16890114.8, filed Dec. 20, 2016, mailed Sep. 11, 2023, 7 pgs.
Ortiz, Jorge Isaac; Office Action for Canadian patent application No. 3, 168,445, filed Dec. 20, 2016, mailed Sep. 22, 2023, 4 pgs.

(56) References Cited

OTHER PUBLICATIONS

Ortiz, Jorge Isaac; Office Action for Canadian patent application No. 3, 168,447, filed Dec. 20, 2016, mailed Sep. 25, 2023, 4 pgs.
Fleury Jr., Leo W.; Notice of Allowance for U.S. Appl. No. 17/536,292, filed Nov. 29, 2021, mailed Feb. 28, 2023, 108 pgs.
Ortiz, Jorge Isaac; Notice of Allowance for U.S. Appl. No. 17/829,759, filed Jun. 1, 2022, mailed Feb. 15, 2023, 17 pgs.
Gibson, Daryl Lee; Final Office Action for U.S. Appl. No. 17/683,090, filed Feb. 28, 2022, mailed Mar. 8, 2023, 16 pgs.
Gibson, Daryl Lee; Notice of Allowance for U.S. Appl. No. 17/245,419, filed Apr. 30, 2021, mailed Feb. 23, 2023, 15 pgs.
Feb. 10, 2023 Ortiz, Jorge Isaac; Final Office Action for U.S. Appl. No. 17/833,230, filed Jun. 6, 2022, mailed Feb. 10, 2023, 30 pgs.
Dec. 13, 2022 Gibson, Daryl Lee; Non-Final Office Action for U.S. Appl. No. 17/683,090, filed Feb. 28, 2022, mailed Dec. 13, 2022, 101 pgs.
Dec. 5, 2022 Fleury Jr., Leo W.; Notice of Allowance for U.S. Appl. No. 16/453,318, filed Jun. 26, 2019, mailed Dec. 5, 2022, 146 pgs.
Dec. 1, 2022 Gibson, Daryl Lee; Office Action for Canadian patent application No. 3,105,683, filed Aug. 7, 2019, mailed Dec. 1, 2022, 3 pgs.
Fleury, Jr., Leo W.; Office Action for Canadian patent application No. 3,161,900, filed Aug. 10, 2012, mailed Aug. 28, 2023, 3 pgs.
Fleury, Jr., Leo W.; Office Action for Canadian patent application No. 3,161,913, filed Aug. 10, 2012, mailed Aug. 22, 2023, 4 pgs.
Gibson, Daryl Lee; Non-Final Office Action for U.S. Appl. No. 17/683,090, filed Feb. 28, 2022, mailed Aug. 2, 2023, 23 pgs.
Gibson, Daryl Lee; Non-Final Office Action for U.S. Appl. No. 17/683,127, filed Feb. 28, 2022, mailed Aug. 30, 2023, 121 pgs.
Gibson, Daryl Lee; Office Action for European patent application No. 19857477.4, filed Aug. 7, 2019, mailed Jul. 31, 2023, 3 pgs.
Fleury Jr., Leo W.; Notice of Allowance for U.S. Appl. No. 16/453,318, filed Jun. 26, 2019, mailed Dec. 5, 2022, 146 pgs.
Fleury Jr., Leo W.; European Search Report for Serial No. 12823594, filed Aug. 10, 2012, mailed Dec. 21, 2017, 4 pgs.
Fleury Jr., Leo W.; European Search Report for Serial No. 12823594, filed Aug. 10, 2012, mailed May 10, 2017, 4 pgs.
Fleury Jr., Leo W.; European Search Report for Serial No. 12823594, filed Aug. 10, 2012, mailed Jun. 8, 2015, 11 pgs.
Gibson, Daryl; Office Action for U.S. Pat. No. 3,057,224, filed Oct. 1, 2019, mailed Jun. 23, 2021, 4 pgs.
Gibson, Daryl Lee; Office Action for Canadian patent application No. 3,105,683, filed Aug. 7, 2019, mailed Dec. 1, 2022, 3 pgs.
Gibson, Daryl Lee; Non-Final Office Action for U.S. Appl. No. 16/874,340, filed May 14, 2020, mailed May 27, 2022, 126 pgs.
Gibson, Daryl Lee; Notice of Allowance for U.S. Appl. No. 16/874,340, filed May 14, 2020, mailed Sep. 12, 2022, 16 pgs.
Ortiz, Jorge Isaac; Notice of Allowance for U.S. Appl. No. 17/833,230, filed Jun. 6, 2022, mailed Apr. 10, 2023, 7 pgs.
Gibson, Daryl Lee; Notice of Allowance for U.S. Appl. No. 17/827,468, filed May 27, 2022, mailed May 15, 2023, 99 pgs.
Gibson, Daryl Lee; Extended European Search Report for application No. 23154819.9, filed Dec. 20, 2016, mailed Apr. 28, 2023, 16 pgs.
Gibson, Daryl Lee; Office Action for European patent application No. 21180958.7, filed Aug. 7, 2019, mailed Apr. 26, 2023, 4 pgs.
Ortiz, Jorge Isaac; Final Office Action for U.S. Appl. No. 17/833,230, filed Jun. 6, 2022, mailed Feb. 10, 2023, 30 pgs.
Gibson, Daryl Lee; Non-Final Office Action for U.S. Appl. No. 17/683,090, filed Feb. 28, 2022, mailed Dec. 13, 2022, 101 pgs.
ABT, Inc., Installation Instructions Belleville Washer springs (Year: 2014).
Qrfs, Storz FDCs and fire Hydrant Storz connections: Adapters or integral Storz, Mar. 2019 (Year: 2019).
Speacialinsert, Inserts for plastic (Year: 2016).
Gibson, Daryl Lee; Non-Final Office Action for U.S. Appl. No. 17/683,090, filed Feb. 28, 2022, mailed Dec. 21, 2023, 20 pgs.
Gibson, Daryl Lee; Final Office Action for U.S. Appl. No. 17/683,127, filed Feb. 28, 2022, mailed Jan. 19, 2024, 36 pgs.
ABT, Inc.; Installation Instructions for Belleville washer springs (Year: 2014), 1 pg.
Endeavour Tools; Catalogue for Security fasteners (Year: 2007), 52 pgs.
Gibson, Daryl Lee; Non-Final Office Action for U.S. Appl. No. 18/106,190, filed Feb. 6, 2023, mailed Dec. 13, 2023, 122 pgs.
Hyland, Gregory E.; Non-Final Office Action of U.S. Appl. No. 18/070,154, filed Nov. 28, 2022, mailed Mar. 27, 2024, 105 pgs.
Fleury, Leo W. Jr.; Office Action for Canadian patent application No. 3,161,904, filed Aug. 10, 2012, mailed Aug. 22, 2023, 4 pgs.
Gibson, Daryl Lee; Final Office Action for U.S. Appl. No. 17/683,090, filed Feb. 28, 2022, mailed Mar. 29, 2024, 18 pgs.
Hyland, Gregory E.; Office Action for Canadian patent application No. 3,177,996, filed Apr. 29, 2020, mailed Apr. 9, 2024, 4 pgs.
Gibson, Daryl Lee; Notice of Allowance for U.S. Appl. No. 18/106,190, filed Feb. 6, 2023, mailed Apr. 12, 2024. 13 pgs.
Gibson, Daryl Lee; Office Action for Canadian patent application No. 3,177,216, filed Dec. 20, 2016, mailed Apr. 2, 2024, 5 pgs.
Fleury, Jr., Leo W.; Office Action for Canadian patent application No. 3,161,913, filed Aug. 10, 2012, mailed Jun. 17, 2024, 3 pgs.

‡ imported from a related application

HYDRANT NOZZLE CAP ADAPTER

CROSS-REFERENCE TO RELATED APPLICATIONS

The present application is a continuation of U.S. application Ser. No. 16/874,340, filed May 14, 2020, which is hereby specifically incorporated by reference herein in its entirety.

TECHNICAL FIELD

This disclosure relates to fire hydrants. More specifically, this disclosure relates to a nozzle cap adapter for mounting a nozzle cap to a hydrant nozzle.

BACKGROUND

Fire hydrants are commonly connected to fluid systems, such as municipal water infrastructure systems and water mains, through standpipes. Nozzle caps can be connected to nozzles of the fire hydrant to seal the nozzles when they are not in use and/or to mount various systems (e.g., a leak detection system) to the nozzles. Fire hydrants can define varying styles of nozzle connections (e.g., threaded nozzle connection, U.S. Storz nozzle connection, Canadian Storz nozzle connection, etc.) to which the nozzle cap can be connected. Nozzle caps configured to connect to a particular style of nozzle connection may be unable to connect to nozzle connections of another style.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a nozzle cap adapter comprising an adapter ring defining a first adapter ring end, a second adapter ring end opposite the first adapter ring end, and an interior void extending from the first adapter ring end to the second adapter ring end; a nozzle connector extending from the second end of the adapter ring, the nozzle connector configured to rotatably engage a fire hydrant nozzle; and a latch coupled to the adapter ring and configured to removably lock the nozzle cap adapter onto the fire hydrant nozzle.

Also disclosed is a nozzle cap assembly comprising a nozzle cap comprising an outer housing and an inner housing; and a nozzle cap adapter coupled to the inner housing, the nozzle cap adapter comprising: an adapter ring; and a nozzle connector extending from the adapter ring, the nozzle connector configured to engage a fire hydrant nozzle.

A method for mounting a nozzle cap to a fire hydrant nozzle is also disclosed, the method comprising providing a nozzle cap assembly, the nozzle cap assembly comprising a nozzle cap and a nozzle cap adapter, the nozzle cap adapter coupled to an inner housing of the nozzle cap, the nozzle cap adapter comprising an adapter ring and a nozzle connector extending from the adapter ring; engaging the nozzle connector with a fire hydrant nozzle; and rotating the nozzle cap assembly relative to the fire hydrant nozzle to secure the nozzle cap assembly to the fire hydrant nozzle.

Additionally, disclosed is a nozzle cap adapter comprising an adapter ring defining a first adapter ring end, a second adapter ring end opposite the first adapter ring end, and an interior void extending from the first adapter ring end to the second adapter ring end; a nozzle connector extending from the second adapter ring end of the adapter ring, the nozzle connector configured to rotatably engage a fire hydrant nozzle; and a latch coupled to the adapter ring and configured to removably lock the nozzle cap adapter onto the fire hydrant nozzle; a gasket housing extending into the interior void and defining a gasket groove, the gasket groove facing the second adapter ring end; and a gasket disposed within the gasket groove and configured to abut an end of the fire hydrant nozzle.

Also disclosed is a nozzle cap assembly comprising a nozzle cap comprising an outer housing and an inner housing; and a nozzle cap adapter coupled to the inner housing, the nozzle cap adapter comprising: an adapter ring defining an interior void; a nozzle connector extending from the adapter ring, the nozzle connector configured to engage a fire hydrant nozzle; a gasket housing extending into the interior void and defining a gasket groove; and a gasket disposed within the gasket groove and configured to abut an end of the fire hydrant nozzle.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
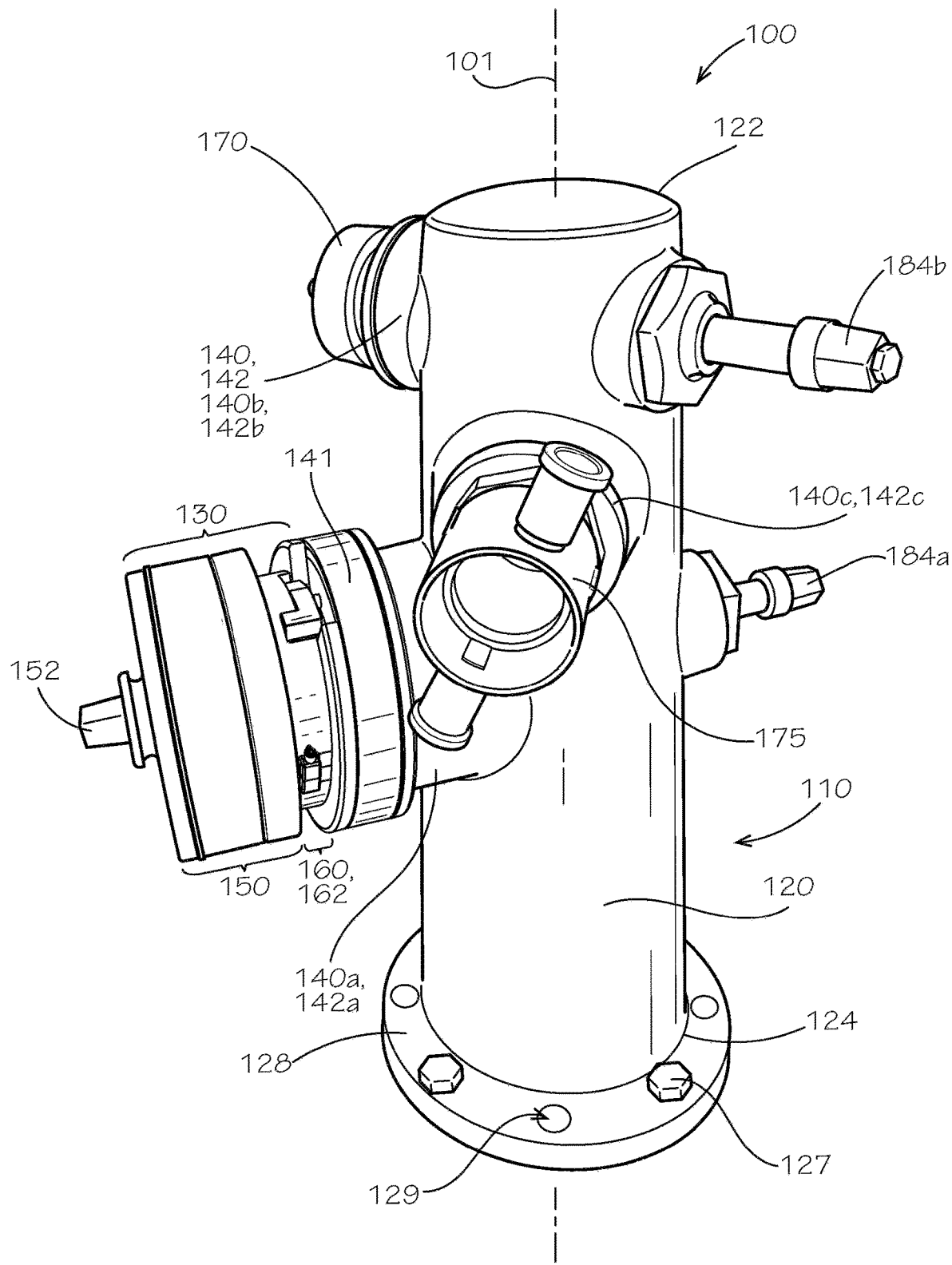
FIG. 1A is a top perspective view of a fire hydrant comprising a nozzle cap assembly, in accordance with another aspect of the present disclosure, wherein the nozzle cap assembly comprises a nozzle cap and a nozzle cap adapter.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a nozzle cap adapter and associated methods, systems, devices, and various apparatus. Example aspects of the nozzle cap adapter can be configured to mount a nozzle cap to a nozzle of a fire hydrant. The nozzle cap can comprise an adapter ring defining one or more nozzle connectors. In some aspects, the nozzle cap adapter can be a U.S. Storz adapter configured to attach to a U.S. Storz nozzle. It would be understood by one of skill in the art that the disclosed nozzle cap adapter is described in but a few exemplary aspects among many. No particular terminology or description should be considered limiting on the disclosure or the scope of any claims issuing therefrom.

FIG. 1A is a perspective view of a hydrant assembly 100 comprising a fire hydrant 110 and a nozzle cap assembly 130, in accordance with one aspect of the present disclosure. The nozzle cap assembly 130 can comprise a nozzle cap 150 and a nozzle cap adapter 160. Example aspects of the fire hydrant 110 can be a wet barrel hydrant, as shown; however, in other aspects, the fire hydrant 110 can be any other type of hydrant known in the art, such as, for example, a dry barrel hydrant. The fire hydrant 110 can comprise a barrel 120 and one or more nozzles 140 (such as nozzles 140*a,b,c*). In some aspects, some or all of the nozzles 140*a,b,c* can comprise a U.S. Storz nozzles 142*a,b,c*. The U.S. Storz nozzles 142 can be non-threaded nozzles that can provide a quarter-turn connection. Furthermore, in some aspects, the nozzle cap adapter 160 can be, for example, a U.S. Storz adapter 162 configured to mount the nozzle cap 150 to a U.S. Storz nozzle 141 of the U.S. Storz nozzle 142*a*. The U.S. Storz connector 141 is shown in further detail in FIG. 1B. In the present aspect, the barrel 120 can be closed at a top barrel end 122 of the barrel 120, as shown. However, other aspects may comprise a hydrant cap or bonnet (not shown) at the top barrel end 122. In a wet barrel hydrant, water can be present and fill the barrel 120 at all times, even when the fire hydrant 110 is not in use. Each of the nozzles 140a,b,c can house its own independent valve (not shown) to prevent or allow water flow to the respective nozzle 140a,b,c. In a dry barrel hydrant, the barrel 120 can be drained of water when the fire hydrant 110 is not in use, and a valve for preventing or allowing water flow to the nozzles 140a,b,c can be housed below ground, such that water will not freeze in the barrel 120 in cold conditions. As shown, example aspects of the barrel 120 can define the top barrel end 122 and a bottom barrel end 124 disposed opposite from the top barrel end 122. Example aspects of the barrel 120 can be substantially tubular and can define a barrel axis 101 extending from the top barrel end 122 to the bottom barrel end 124. In the present aspect, the barrel axis 101 can be substantially vertically aligned.

According to example aspects, the barrel 120 can comprise a base flange 128 disposed at the bottom barrel end 124. The base flange 128 can be fastened to a fluid system (not shown), such as a water main. In one aspect, the base flange 128 can be fastened to a standpipe flange of a standpipe, for example and without limitation. The base flange 128 of the barrel 120 can define a plurality of fastener openings 129 and can be fastened to the fluid system (e.g., to the standpipe flange) by one or more fasteners 127, such as bolt and nut assemblies, engaged with the fastener openings 129. In other aspects, the base flange 128 can be fastened to the standpipe flange by any other suitable connection method known in the art, such as, for example and without limitation, threading, adhesives, welding, any suitable mechanical fasteners, or the like. As shown, example aspects of the barrel 120 can comprise a first operation nut 184a, or "op nut", positioned opposite the nozzle 140a and nozzle cap 150, which can be rotated to open and close a first valve (not shown) mounted in the nozzle 140a in order to respectively supply or cut off pressurized water flow through the nozzle 140a from the barrel 120. Example aspects of the barrel 120 can further comprise a second operation nut 184b positioned opposite the nozzle 140b, which can be operated to open and close a second valve (not shown) mounted in the nozzle 140b, and a third operation nut (not shown) positioned opposite the nozzle 140c, which can be operated to open and close a third valve (not shown) mounted in the nozzle 140c.

According to example aspects, the nozzle cap 150 can be screwed onto the nozzle 140a to seal the nozzle 140a in a sealed orientation. With the nozzle cap 150 sealing the nozzle 140a, pressurized water from the fluid system cannot escape through the nozzle 140a. As shown, the nozzle cap 150 can define a cap nut 152 that can be turned, such as with a wrench or another suitable tool, to tighten or loosen the nozzle cap 150 on the nozzle 140a. Furthermore, in some aspects, a hose cap 170 can be screwed onto the nozzle 140b to seal the nozzle 140b in a sealed orientation. Some aspects, such as the present aspect, can further comprise a quick connect adapter 175 attached to the nozzle 140c for to facilitate the attachment of a fire hose (not shown) to the nozzle 140c. According to example aspects, the fire hydrant 110 can be formed from a metal material, such as, for example, cast or ductile iron, and some or all of the nozzles 140a,b,c can be formed from a metal material, such as cast or ductile iron. In other aspects, however, the fire hydrant 110 and/or the nozzles 140a,b,c can be formed from any other suitable material or combination of materials known in the art.

In example aspects, the nozzle cap 150 can comprise a leak detection system (not shown). For example, the nozzle cap 150 may comprise a vibration sensor, which can be configured to detect leaks within the fluid system by monitoring vibrations travelling up the standpipe and through the fire hydrant 110 when the nozzle cap 150 is mounted on the nozzle 140a. Vibration patterns within the fluid system can indicate the presence of leaks within the fluid system. According to example aspects, the nozzle cap 150 can further comprise an antenna (not shown), which can be configured to transmit a signal outwards from the nozzle cap 150 to convey whether leaks have been identified within the fluid system.

Figure 1B:
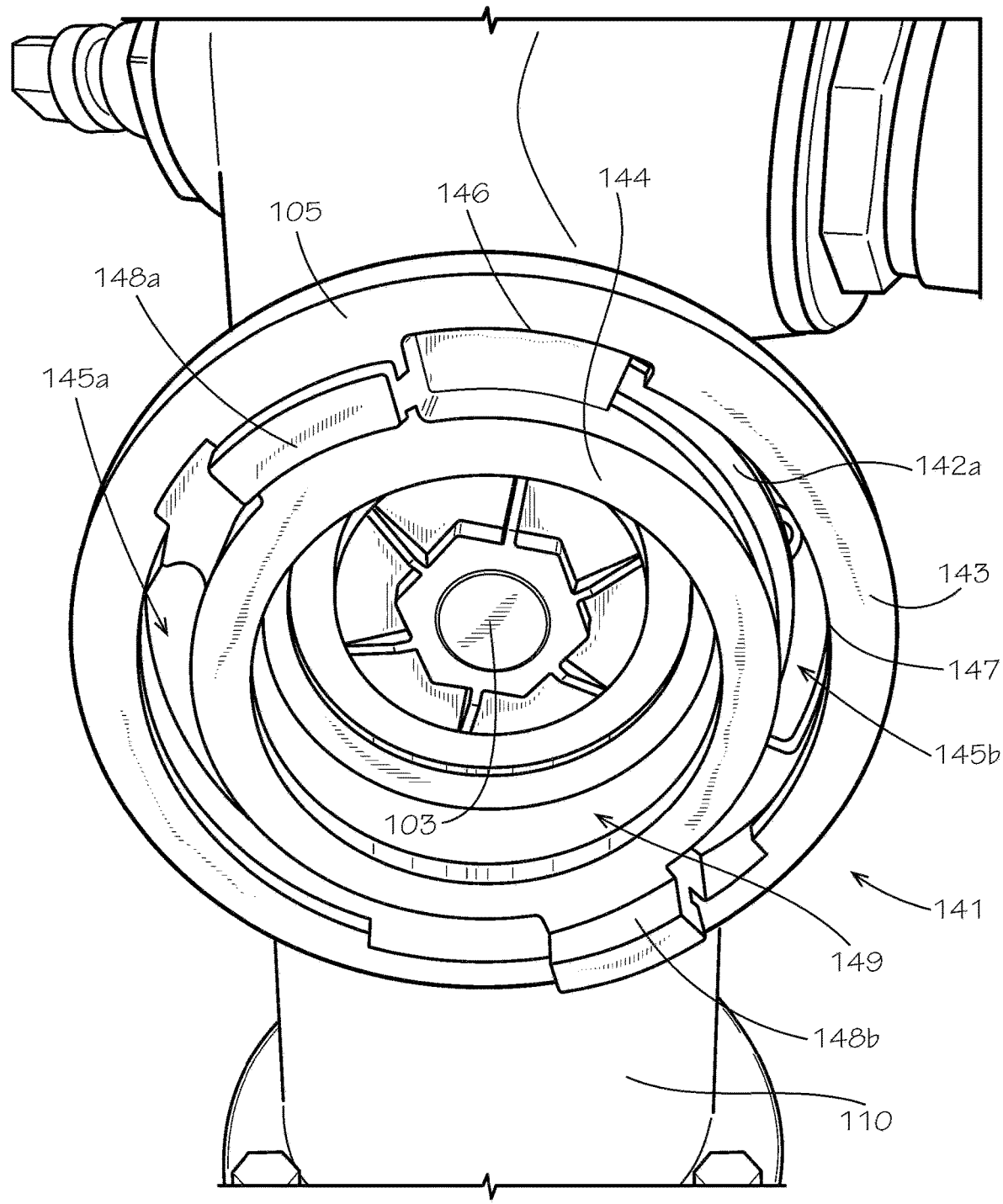
FIG. 1B is a front view of the fire hydrant of FIG. 1A with the nozzle cap assembly removed.

FIG. 1B illustrates the U.S. Storz connector 141 of the U.S. Storz nozzle 142a with the nozzle cap assembly 130 (shown in FIG. 1A) removed. As shown, the U.S. Storz connector 141 can generally comprise an outer ring 143 and an inner ring 144 connected to the outer ring 143, and can define a substantially circular shape. The U.S. Storz connector 141 can further define an opening 149 formed through a center thereof in some aspects, and the opening 149 can define a connector axis 103 (extending substantially into the page in the present view). A first arcuate slot 145a can be defined between the outer and inner rings 143,144. A second arcuate slot 145b can also be defined between the outer and inner rings 143,144 opposite the first arcuate slot 145a. The first and second arcuate slots 145a,b can be substantially concentric to the connector axis 103 in some aspects, as shown. Each of the first and second arcuate slots 145a,b can define an insertion region 146 and a locking region 147 extending from the insertion region 146, wherein the insertion region 146 can define a width greater than a width of the locking region 147. According to example aspects, the U.S. Storz connector 141 can further comprise a first connector arm 148a and a second connector arm 148b, wherein each of the first and second connector arms 148a,b can extend substantially in the axial direction from a first end 105 of the U.S. Storz connector 141. As shown, the first end 105 of the U.S. Storz connector 141 can be distal to the fire hydrant 110. According to example aspects, the nozzle cap adapter 160 (shown in FIG. 1A), e.g., the U.S. Storz adapter 162 (shown in FIG. 1A), can comprise a pair of nozzle connectors 310 (shown in FIG. 3), wherein each of the nozzle connectors 310 can be configured to engage one of the arcuate slots 145a,b to couple the nozzle cap assembly 130 (shown in FIG. 1A) to the U.S. Storz nozzle 142a, as described in further detail below. Furthermore, each of the of the first and second connector arms 148a,148b of the U.S. Storz connector 141 can be configured to engage a corresponding ramped surface 403 of the nozzle cap adapter 160 to tighten the nozzle cap assembly 130 with the U.S. Storz nozzle 142a, as described in further detail below.

Figure 2:
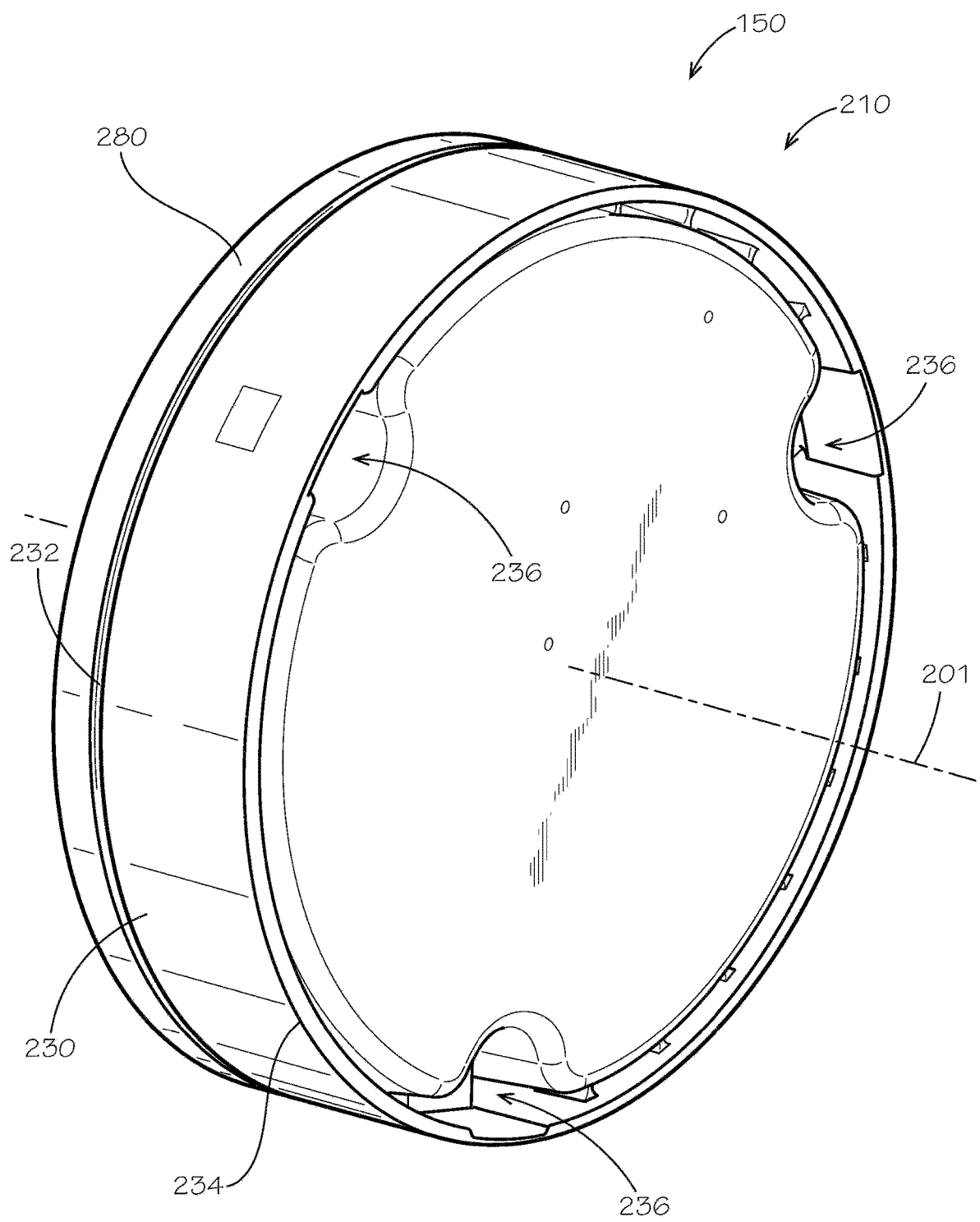
FIG. 2 is a rear perspective view of the nozzle cap of FIG. 1A, in accordance with one aspect of the present disclosure.

FIG. 2 is a rear perspective view of the nozzle cap 150 of FIG. 1A. The nozzle cap 150 can comprise a cap body 210 and a cap cover 280. Example aspects of the cap cover 280 can be formed from a metal material, such as for example, ductile iron, or can be formed from a plastic material, or any other suitable material known in the art. The cap body 210 can comprise an outer housing 230 and an inner housing 340 (shown in FIG. 3). According to example aspects, the outer housing 230 can be substantially cylindrical in shape and can define a first outer housing end 232 and a second outer housing end 234 disposed opposite from the first outer housing end 232. The cap cover 280 can be mounted to the outer housing 230 at the first outer housing end 232, and the inner housing 340 can be mounted to the outer housing 230 at the second outer housing end 234. Furthermore, the outer housing 230 can define a cap axis 201 extending generally through a center thereof, and the cap axis 201 can extend from the first outer housing end 232 to the second outer housing end 234.

According to example aspects, the outer housing 230 and/or the inner housing 340 can be formed from a substantially rigid material. For example, the inner housing 340 can be formed from a metal material, such as, for example, aluminum, and the outer housing 230 can be formed from a plastic material. Example aspects of the plastic material of the outer housing 230 can be a glass-filled plastic material to provide an improved acoustic performance for the leak detection system. In example aspects, the leak detection system can be housed, or primarily housed, in the outer housing 230. In other aspects, each of the inner housing 340 and outer housing 230 can be formed from any other suitable material known in the art.

As shown, in the present aspect, the outer housing 230 can define one or more mounting recesses 236 formed at the second outer housing end 234 thereof, wherein each of the mounting recesses 236 can be configured to receive a corresponding primary mounting leg 442 (shown in FIG. 4A) of the inner housing 340. In some example aspects, a mounting recess hole (not shown) can be formed through each mounting recess 236, and a corresponding cap cover hole (not shown) can be formed through the cap cover 280 and aligned with each of the mounting recess holes. Furthermore, a primary mounting leg hole 544 (shown in FIG. 5) can be formed through each of the primary mounting legs 442. A nozzle cap fastener (not shown), such as, for example and without limitation, a bolt or a screw, can be configured to extend through each corresponding cap cover hole, mounting recess hole, and primary mounting leg hole 544 to couple the cap cover 280, inner housing 340, and outer housing 230 together. In the present aspect, three mounting recesses 236 and three primary mounting legs 442 are present, but other aspects can comprise more or fewer mounting recesses 236 and primary mounting legs 442. Furthermore, according to example aspects, the nozzle cap 150 can be a modular system wherein various components of the nozzle cap 150, such as the outer housing 230, can be easily removed and/or replaced, as desired. For example, it may be desired to remove the outer housing 230 temporarily for repair or to replace the removed outer housing 230 with a new outer housing 230 or a different cap body module. For example, the nozzle cap 150 can be similar to the modular nozzle cap disclosed in U.S. patent application Ser. No. 16/428,744, filed May 31, 2019, which is hereby specifically incorporated by reference herein in its entirety.

Figure 3:
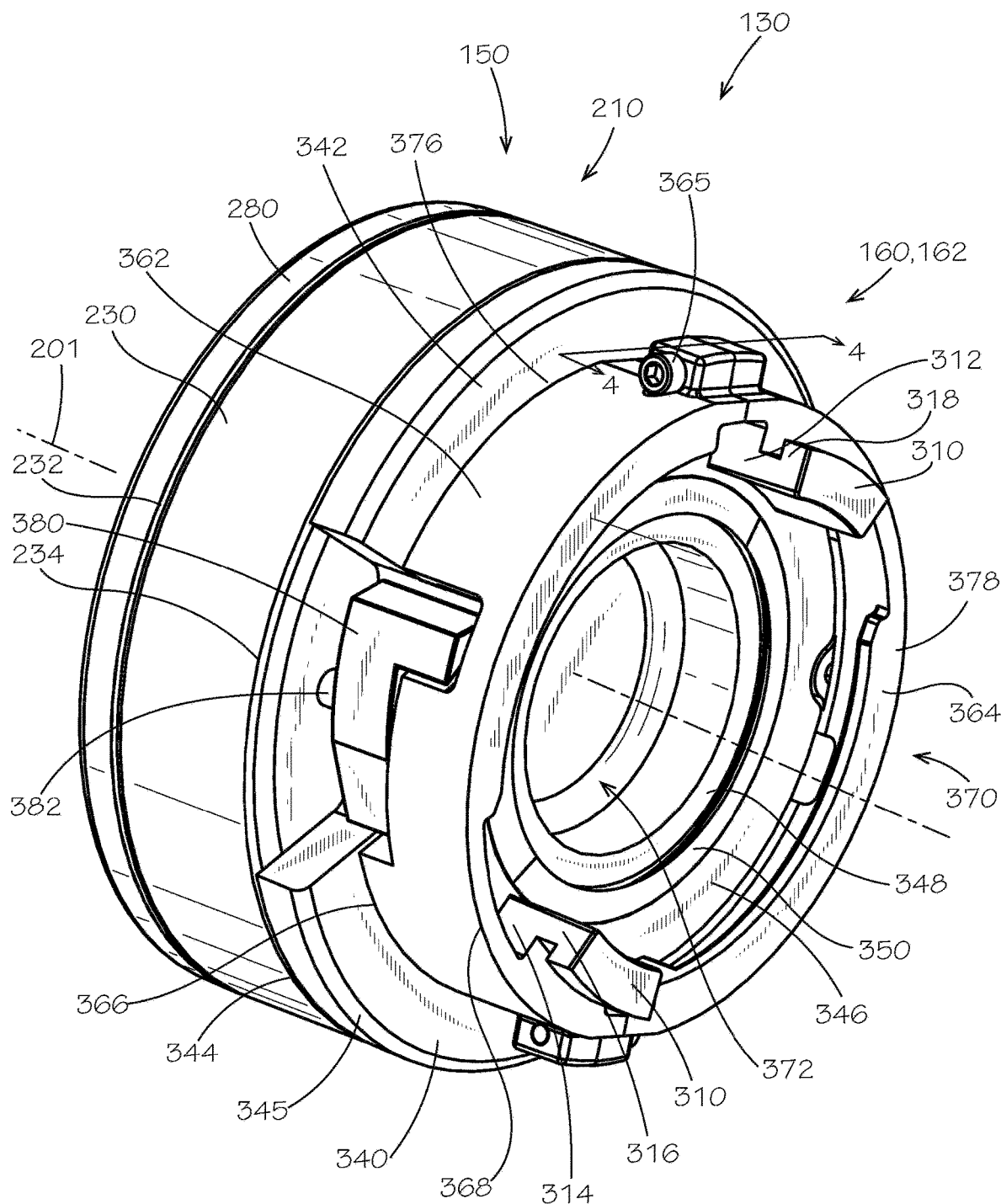
FIG. 3 is a rear perspective view of the nozzle cap of FIG. 1A coupled to the nozzle cap adapter of FIG. 1.

FIG. 3 illustrates a rear perspective view of the nozzle cap assembly 130 comprising the nozzle cap 150 and the nozzle cap adapter 160. As shown, the inner housing 340 of the cap body 210 is mounted to the outer housing 230 of the cap body 210. The inner housing 340 can comprise a housing body 342, which can be substantially disc-shaped in the present aspect. Other aspects of the housing body 342 can define any other suitable shape. The housing body 342 can generally define a first housing body end 344 and a second housing body end 345, wherein the primary mounting legs 442 (shown in FIG. 4A) can extend from the first housing body end 344. As such, in some aspects, when the primary mounting legs 442 are received within the mounting recesses 236 (shown in FIG. 2), the first housing body end 344 of the housing body 342 can be configured to abut the outer housing 230 at the second outer housing end 234 thereof. As shown, the nozzle cap adapter 160 can be coupled to the inner housing 340, wherein the nozzle cap adapter 160 can be configured to attach the nozzle cap 150 to the nozzle 140a. According to example aspects, the inner housing 340 can define an annular outer flange 346 and an annular inner flange 348, each of which can be substantially concentric to the cap axis 201. The annular outer flange 346 and annular inner flange 348 can extend generally axially away from the second housing body end 345 of the housing body 342, relative to the cap axis 201. According to example aspects, an annular gasket groove 460 (shown in FIG. 4A) can be defined between the annular outer flange 346 and the annular inner flange 348, and an annular gasket 350 can be received within the annular gasket groove 460, as shown. In example aspects, the gasket 350 can be configured to abut an end of the nozzle 140a when the nozzle cap 150 is mounted thereto, in order to create a seal between the nozzle cap 150 and the nozzle 140a.

Example aspects of the nozzle cap adapter 160 can comprise a first adapter segment 362 and a second adapter segment 364. Each of the first and second adapter segments 362,364 can be substantially semi-cylindrical in shape, such that the first and second adapter segments 362,364 can together define a substantially circular adapter ring 370. The circular adapter ring 370 can define an interior void 372, as shown. The first adapter segment 362 and second adapter segment 364 can be joined together by one or more adapter segment fasteners 365, as described in further detail below with respect to FIG. 4A. In example aspects, the first and second adapter segments 362,364 can be clamped around the outer flange 346 of the inner housing 340 to secure the adapter ring 370 thereto, as is also described in further detail below with respect to FIG. 4A. Example aspects of the nozzle cap adapter 160 can further comprise a latch 380 pivotally coupled to the first adapter segment 362 by a latch fastener 382. In other aspects, the latch 380 can be coupled to the second adapter segment 364. The latch 380 can be configured to engage the nozzle 140a (shown in FIG. 1A) to lock the nozzle cap assembly 130 onto the nozzle 140, preventing unintentional removable of the nozzle cap assembly 130 from the fire hydrant 110 (shown in FIG. 1A), as is described in further detail below with respect to FIG. 4A. In some example aspects, the latch 380 can be spring-loaded.

According to example aspects, as shown, each of the first and second adapter segments 362,364 can define a first adapter segment end 366 and a second adapter segment end 368. The first adapter segment end 366 of each of the first and second adapter segments 362,364 can be substantially aligned to generally define a first adapter ring end 376 of the adapter ring 370, and the second adapter segment end 368 of each of the first and second adapter segments 362,364 can be substantially aligned to generally define a second adapter ring end 378 of the adapter ring 370. As shown, each of the first and second adapter segments 362,364 can comprise a one of the nozzle connectors 310 extending from the corresponding second adapter segment end 368, away from the inner housing 340. In the present aspect, the nozzle connectors 310 can be oriented on substantially opposite circumferential sides of the adapter ring 370. In some aspects, as shown, each of the nozzle connectors 310 can generally define an L-shape, wherein a leg 312 of the nozzle connector 310 is coupled at a proximal end 314 thereof to the second adapter ring end 378 and extends substantially axially therefrom, and an arm 318 of the nozzle connector 310 extends from a distal end 316 of the leg 312 and extends substantially radially outward therefrom. As such, the arm 318 of the nozzle connector 310 can be oriented about perpendicular to the leg 312 of the nozzle connector 310. According to example aspects, one or both of the first and second adapter segments 362,364 can further define the ramped surface 403 extending from of the inner adapter segment surface 478 at or near the second adapter segment end 368. In example aspects, a height of each of the ramped surfaces 403 can increase along its length.

In example aspects, each of the nozzle connectors 310 can be configured to rotatably engage the U.S. Storz connector 141 (shown in FIG. 1A-1B) of the nozzle 140a. For example, in some aspects, each of the nozzle connectors 310 can be inserted into the insertion region 146 (shown in FIG. 1B) of a corresponding one of the arcuate slots 145a,b (shown in FIG. 1B) of the U.S. Storz connector 141. The nozzle cap assembly 130 can then be rotated in a first direction (e.g., clockwise) relative to the nozzle 140a to rotate each of the nozzle connectors 310 into the locking region 147 of the corresponding arcuate slot 145a,b. For example, in aspects wherein the nozzle cap adapter 160 is the U.S. Storz adapter 162, and the nozzle 140a is the U.S. Storz nozzle 142a, the nozzle cap assembly 130 can be rotated a quarter turn relative to the U.S. Storz nozzle 142a to engage the U.S. Storz adapter 162 therewith and to secure the nozzle cap assembly 130 thereto. As described above, the width of each locking region 147 can be lesser than the width of the corresponding insertion region 146. As such, when the nozzle connectors 310 are rotated into the corresponding locking regions 147, the arm 318 of each nozzle connector can engage the outer ring 143 of the U.S. Storz connector 141 to prohibit movement and/or removal of the nozzle cap assembly 130 in the axial direction. According to example aspects, the latch 380 can be configured to catch on one of the first and second connector arms 148a,b to prohibit rotation movement and/or removal of the nozzle cap assembly 130 in a reverse direction (e.g., counter-clockwise), as described in further detail below with respect to FIG. 4B. Moreover, each of the connector arms 148a,b of the U.S. Storz connector 141 can be configured to engage a corresponding one of the ramped surfaces 403 as the nozzle cap assembly 130 is rotated. In example aspects, as described above, the height of each of the ramped surfaces 403 can increase along its length. The rotation of the nozzle cap assembly 130 can move the connector arms 148a,b in the direction of the increasing height of the ramped surfaces 403, and as such, the ramped surfaces 403 can increasingly engage the connector arms 148a,b to tighten the nozzle cap assembly 130 onto the U.S. Storz connector 141.

Figure 4A:
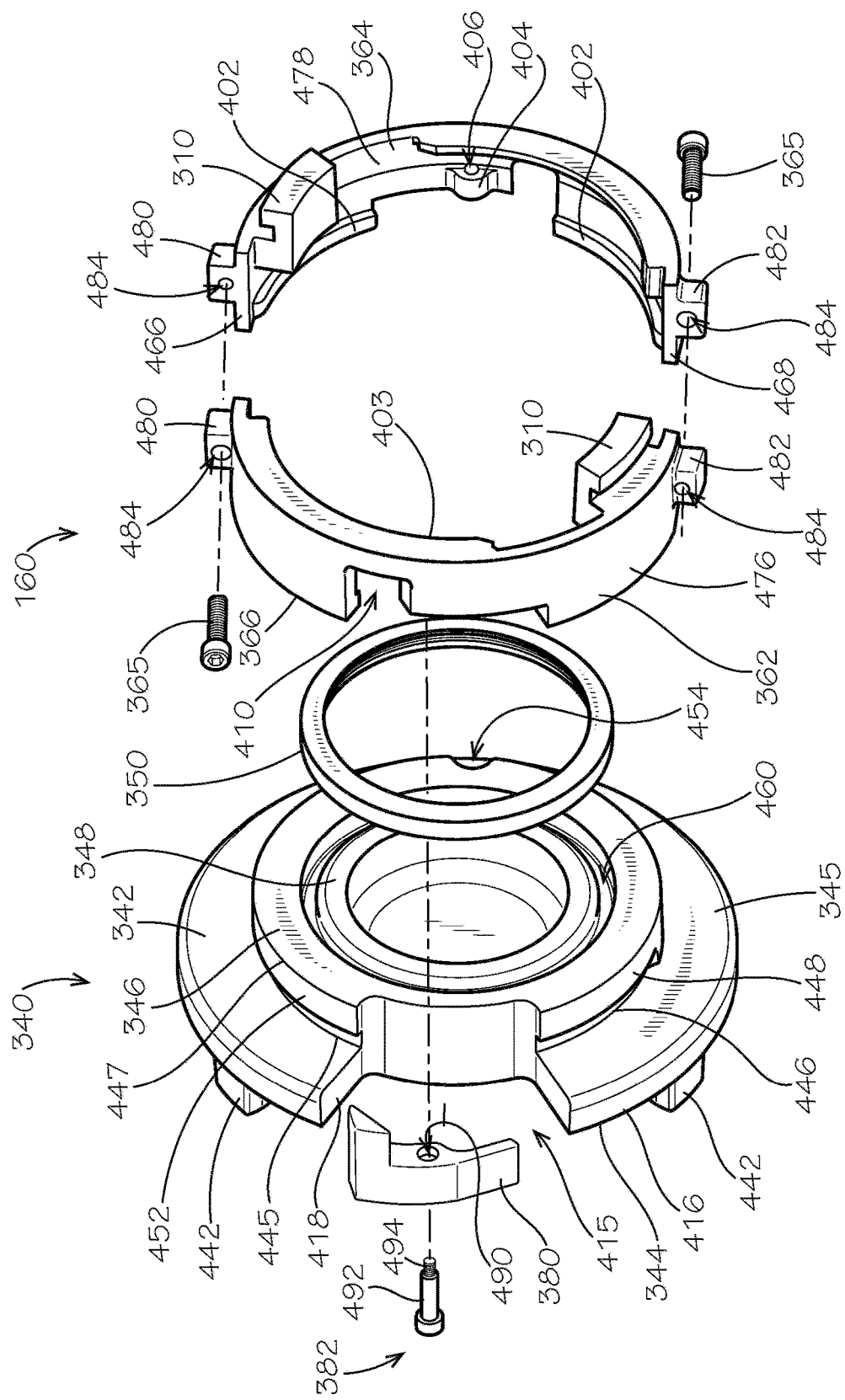
FIG. 4A is an exploded view of the nozzle cap adapter of FIG. 1A.

FIG. 4A illustrates an exploded view of the nozzle cap adapter 160 and the inner housing 340. As shown, the inner housing 340 can define the primary mounting legs 442 extending away from the first housing body end 344 of the housing body 342 in a substantially axial direction. The inner housing 340 can further define the outer flange 346 and inner flange 348 extending away from the second housing body end 345 of the housing body 342 in a substantially axial direction, and the gasket groove 460 can be defined between the outer and inner flanges 346,348. The annular gasket 350 is provided and can be received within the gasket groove 460 when assembled with the inner housing 340. In example aspects, one or more arcuate recesses 446 formed about a circumference of the outer flange 346 at a proximal flange end 445 of the outer flange 346, adjacent to the second housing body end 345. The arcuate recesses 446 can extend generally radially inward from an outer flange surface 448 of the outer flange 346, as shown, and a non-recessed portion 452 of the outer flange 346. As shown, example aspects of the outer flange 346 can further define a semi-cylindrical recess 454 formed in the outer flange surface 448 thereof. In the present aspect, the semi-cylindrical recess 454 can extend substantially along a length of the outer flange 346, from the proximal flange end 445 thereof to a distal flange end 447 thereof.

Each of the first and second adapter segments 362,364 can be substantially semicircular in shape and can define a first adapter segment circumferential end 466 and a second adapter segment circumferential end 468. Each of the first and second adapter segments 362,364 can further define an outer adapter segment surface 476 and an inner adapter segment surface 478. In the assembled configuration, the first adapter segment circumferential ends 466 of the corresponding first and second adapter segments 362,364 can be joined together and the second adapter segment circumferential ends 468 of the corresponding first and second adapter segments 362,364 can be joined together to couple the first adapter segment 362 to the second adapter segment 364. Coupling the first and second adapter segments 362,364 together can define the adapter ring 370 (shown in FIG. 3). In the present aspect, each of the first and second adapter segments 362,364 can define a first fastener block 480 at the corresponding first adapter segment circumferential end 466 thereof. Each of the first and second adapter segments 362,364 can further define a second fastener block 482 at the corresponding second adapter segment circumferential end 468 thereof. Each of the first and second fastener blocks 480,482 can extend outward from the outer adapter segment surface 476 of the corresponding first and second adapter segments 362,364. As shown, an adapter segment fastener hole 484 can be formed through each of the first and second fastener blocks 480,482. A first one of the adapter segment fasteners 365 can engage the adapter segment fastener holes 484 of the pair of first fastener blocks 480 to couple the first adapter segment circumferential ends 466 to one another, and a second one of the adapter segment fasteners 365 can engage the adapter segment fastener holes 484 of the pair of second fastener blocks 482 to couple the second adapter segment circumferential ends 468 to one another. In example aspects, each of the adapter segment fasteners 365 can define threading configured to engage mating threading formed in the corresponding adapter segment fastener holes 484. The coupling of the first adapter segment 362 to the second adapter segment 364 by the adapter segment fasteners 365 is shown and described in further detail below with respect to FIG. 4C.

One or both of the first and second adapter segments 362,364 can define one or more arcuate ribs 402 projecting generally radially inward from the corresponding inner adapter segment surface 478 and extending at least partially along a circumference of the inner adapter segment surface 478 adjacent to the first adapter segment end 366. In some aspects, one or both of the first and second adapter segments 362,364 can further define one or more substantially semi-cylindrical ribs 404 projecting generally radially inward from the corresponding inner adapter segment surface 478 and defining a substantially semi-circular cross section. In some aspects, the semi-cylindrical rib 404 can define a rib fastener hole 406 therethrough, as shown, as will be described in further detail below. Referring to the second adapter segment 364, in the present aspect, the semi-cylindrical rib 404 can be formed adjacent to the first adapter segment end 366 and can be oriented between a pair of the arcuate ribs 402.

To secure the first and second adapter segments 362,364 to the inner housing 340, each of the first and second adapter segments 362,364 can be clamped around the outer flange 346 of the inner housing 340, and each of the arcuate ribs 402 can be configured to engage the arcuate recesses 446 formed in the outer flange 346 to prevent axial movement of the first and second adapter segments 362,364 relative to the inner housing 340. For example, axial movement can be prevented by the interference of the non-recessed portion 452 of the outer flange 346 with the arcuate ribs 402. Furthermore, the semi-cylindrical rib(s) 404 can engage the corresponding semi-cylindrical recess(es) 454 formed in the outer flange 346 to prevent rotational movement of the first and/or second adapter segments 362,364 relative to the inner housing 340. The adapter segment fasteners 365 can then couple the first adapter segment 362 to the second adapter segment 364 to define the adapter ring 370 and to prevent removal of the adapter ring 370 from the inner housing 340.

As shown, the latch 380 can be a substantially L-shaped latch 380. In other aspects, the latch 380 can define any other suitable shape. The latch 380 can define a key fastener hole 490 extending therethrough. According to example aspects, the latch 380 can be configured to nest in a latch cutout 410 formed in the first adapter segment 362. In the present aspect, the latch cutout 410 can be substantially L-shaped to generally match the L-shape of the latch 380. Furthermore, example aspects of the latch cutout 410 can be formed at the first adapter segment end 366 and can extend from the outer adapter segment surface 476 to the inner adapter segment surface 478. In other aspects, the latch cutout 410 can be differently configured. In the present aspect, the first adapter segment 362 and second adapter segment 364 can be substantially the same; for example, in some aspects, the first and second adapter segments 362,364 may be formed from the same mold or an identical mold for ease of manufacturing. As such, in the present aspect, the second adapter segment 364 can also define the latch cutout 410, but the latch cutout 410 of the second adapter segment 364 can be superfluous. In other aspects, the first and second adapter segments 362,364 can differ in configuration.

The inner housing 340 can define an inner housing cutout 415 defined by a boundary 418. In example aspects, the inner housing cutout 415 can be aligned with the latch cutout 410 of the first adapter segment 362 and can be configured to receive at least a portion of the latch 380. Example aspects of the inner housing cutout 415 can extend radially inward from a peripheral edge 416 of the housing body 342, and in the present aspect, can extend from the first housing body end 344 to the second housing body end 345. In some aspects, as shown, the inner housing cutout 415 can also extend radially inward from the outer flange surface 448 of the outer flange 346 and can span the length of the outer flange 346 from the proximal flange end 445 to the distal flange end 447. As such, the inner housing cutout 415 can span a full length of the inner housing 340, from the first housing body end 344 to the distal flange end 447. In other aspects, the inner housing cutout 415 may not span the full length of the inner housing 340 and/or may not extend into the outer flange 346.

According to example aspects, the key fastener hole 490 of the latch 380 can be aligned with the rib fastener hole 406 of the semi-cylindrical rib 404 located on the first adapter segment 362. (In the present view, only the semi-cylindrical rib 404 of the second adapter segment 364 is visible.) In this configuration, the latch 380 can be received within the latch cutout 410 of the first adapter segment 362. To couple the latch 380 to the first adapter segment 362, the latch fastener 382 can extend through each of the key fastener hole 490 and the rib fastener hole 406. In the present aspect, as shown, the latch fastener 382 can define an un-threaded portion 492 configured to extend through the key fastener hole 490 and a threaded portion 494 configured to thread with mating threading (not shown) formed in the rib fastener hole 406. As such, the latch fastener 382 can be inserted through the key fastener hole 490, and then rotated to advance the engagement of the threaded portion 494 with the rib fastener hole 406, tightening the latch fastener 382 into the first adapter segment 362.

When the nozzle cap adapter 160 is assembled to the inner housing 340, the latch 380, or portions thereof, can be received within the inner housing cutout 415, as illustrated in FIG. 3. In example aspects, the latch 380 can be configured to engage the nozzle 140a (shown in FIG. 1A) when the nozzle cap assembly 130 (shown in FIG. 1A) is mounted thereto. For example, in a particular aspect, the spring-loaded latch 380 can be configured to slip over and catch on one of the connector arms 148a,b of the nozzle 140a to aid in securing the nozzle cap assembly 130 thereto. To remove the nozzle cap assembly 130 from the nozzle 140a, a user can push the latch 380 in to disengage the latch 380 from the first or second connector arms 148a,b, as described in further detail below, allowing for removal of the nozzle cap assembly 130.

Figure 4B:
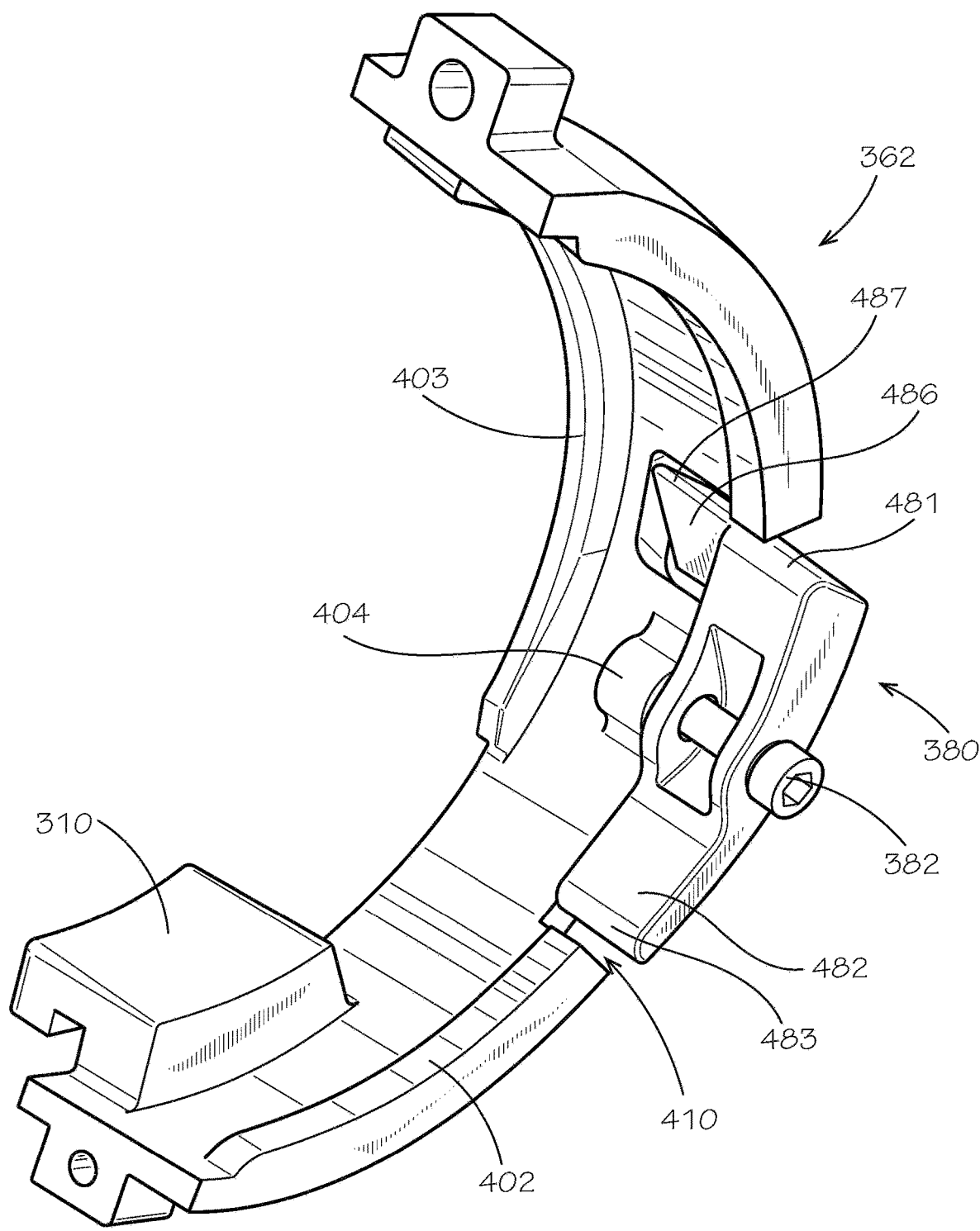
FIG. 4B is a perspective view of a first adapter segment of the nozzle cap adapter of FIG. 1A.

FIG. 4B illustrates the latch 380 in further detail. As shown, the latch 380 can be received within the latch cutout 410 and can be pivotably mounted to the first adapter segment 362 by the latch fastener 382. Example aspects of the latch 380 can be spring-biased to an engaged configuration, as shown, but can be rotatable to a disengaged configuration upon application of a sufficient force, as described in additional detail below. As shown, in the present aspect, the latch 380 can define a latch leg 482 defining a first latch leg end 481 and a second latch leg end 483. The latch 380 can further define a latch arm 486 extending from the latch leg 482 proximate to the first latch leg end 481 and oriented substantially perpendicular to the latch leg 482. According to some example aspects, the latch arm 486 may define a sloped latch surface 487, as shown. In the engaged configuration, the spring-biased latch 380 can be oriented such that the latch arm 486 can be rotated generally inward toward the cap axis 201 (shown in FIG. 3), while the second latch leg end 483 can rotated generally outward. In the disengaged configuration, a force (e.g., a manual force or a force supplied by a tool) can be applied to the second latch leg end 483 of the latch leg 482 to rotate the second latch leg end 483 inward and to rotate the latch arm 486 outward.

In example aspects, as described above, the nozzle connectors 310 of the nozzle cap adapter 160 (shown in FIG. 1A) can engage the insertion region 146 (shown in FIG. 1B) of a corresponding one of the arcuate slots 145a,b (shown in FIG. 1B) of the U.S. Storz connector 141 (shown in FIGS. 1A-1B), and the nozzle connectors 310 can be rotated in the first direction (e.g., clockwise) into the locking region 147 (shown in FIG. 1B) of the corresponding arcuate slot 145a,b. As the nozzle cap adapter 160 is rotated, the latch 380 can also be rotated towards a corresponding one of the connector arms 148a or 148b. When the latch 380 passes the corresponding connector arm 148a,b, the latch arm 486 of the spring-biased latch 380 can be biased inward (i.e., the latch arm 486 can pivot inward about the latch fastener 382 towards the cap axis 201), such that the latch 380 can catch against the corresponding connector arm 148a,b. The engagement of the latch arm 486 with the corresponding connector arm 148a,b can prohibit the nozzle cap adapter 160 from being rotated in the reverse direction (e.g., counter-clockwise), and thus, can prohibit removal of the nozzle cap assembly 130 (shown in FIG. 1A) from the fire hydrant 110 (shown in FIG. 1A). However, when a suitable force is applied to the second latch leg end 483 of the latch leg 482, the latch arm 486 can be pivoted outward, such that the latch 380 can clear the corresponding connector arm 148a,b, and the nozzle cap assembly 130 can be rotated in the reverse direction for removal from the fire hydrant 110.

Figure 4C:
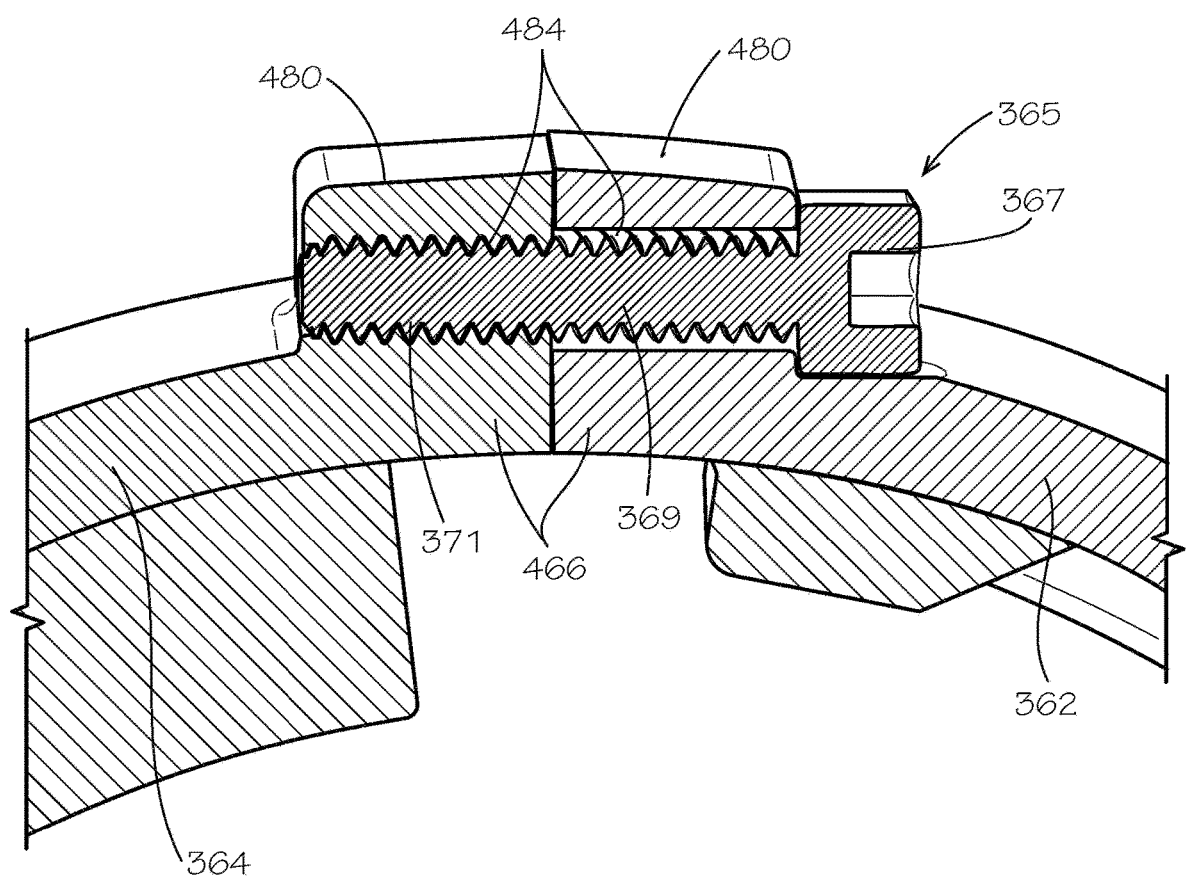
FIG. 4C is a detail cross-sectional view of a first adapter segment of the nozzle cap adapter of FIG. 1A coupled to a second adapter segment of the nozzle cap adapter of FIG. 1A, taken along line 4-4 of FIG. 3.

FIG. 4C illustrates a cross-sectional detail view of the first adapter segment circumferential ends 466 of the first and second adapter segments 362,364 joined together by the corresponding adapter segment fastener 365. As shown, in example aspects, the adapter segment fastener 365 can define a fastener head 367 and a fastener tail 369 extending from the fastener head 367. The fastener tail 369 can define fastener threading 371 in some aspects. In the present aspect, the fastener tail 369 can be inserted through the adapter segment fastener hole 484 of the first fastener block 480 of the first adapter segment 362, which can be an unthreaded hole in some aspects. The adapter segment fastener 365 can then thread into the adapter segment fastener hole 484 of the second adapter segment 364, which can be a threaded hole in the present aspect, to secure the first adapter segment 362 to the second adapter segment 364 at the first adapter segment circumferential ends 466 thereof. According to example aspects, the second adapter segment circumferential ends 468 can be secured together in substantially the same manner.

Figure 5:
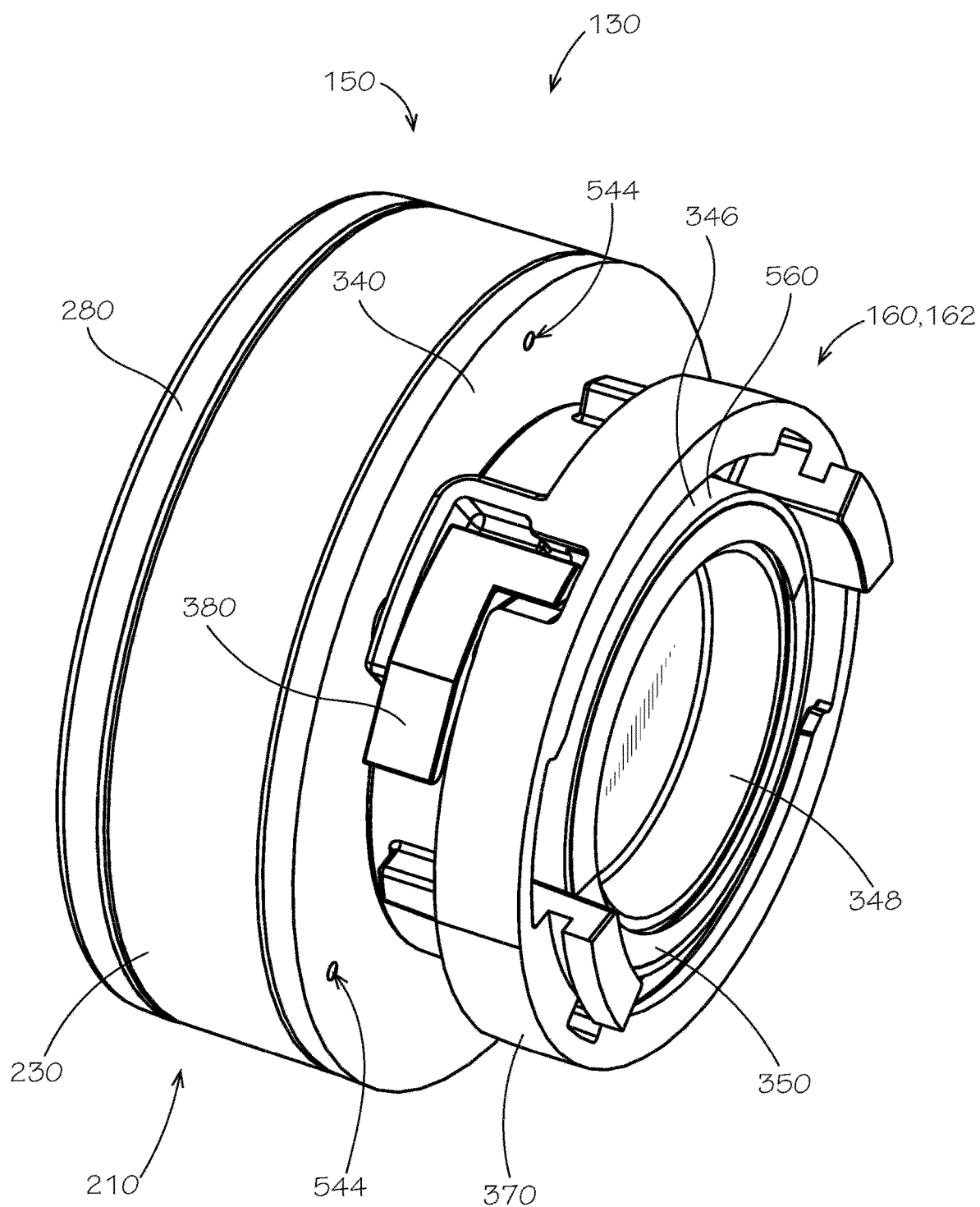
FIG. 5 is a rear perspective view of the nozzle cap coupled to the nozzle cap adapter, in accordance with another aspect of the present disclosure.

FIG. 5 illustrates the nozzle cap assembly 130 comprising the nozzle cap 150 and the nozzle cap adapter 160, in accordance with another aspect of the present disclosure. As shown, the nozzle cap 150 can comprise the cap cover 280 and the cap body 210, and the cap body 210 can comprise the outer housing 230 and the inner housing 340. The nozzle cap adapter 160 can be coupled to the inner housing 340 of the nozzle cap 150 to allow the nozzle cap 150 to be mounted to the nozzle 140a (shown in FIG. 1A) of the fire hydrant 110 (shown in FIG. 1A). For example, the nozzle cap adapter 160 can again be the U.S. Storz adapter 162, which can be configured to mount the nozzle cap 150 to the U.S. Storz nozzle 142a (shown in FIG. 1A). The nozzle cap adapter 160 can comprise the adapter ring 370, latch 380, and gasket 350, as shown. Furthermore, as shown in the present aspect, the inner housing 340 may not comprise the outer and inner flanges 346,348. Rather, the nozzle cap adapter 160 can comprise a gasket housing 560, and the gasket housing 560 can comprise the outer and inner flanges 346,348. The outer and inner flanges 346,348 of the gasket housing 560 can define the gasket groove 460 (shown in FIG. 6) therebetween, which can be configured to receive the gasket 350 therein. The gasket housing 560 can be coupled to one or both of the inner housing 340 and adapter ring 370, as described in further detail below with respect to FIG. 6. In some aspects, as shown, the inner housing 340 also may not comprise the inner housing cutout 415 (shown in FIG. 4A).

Figure 6:
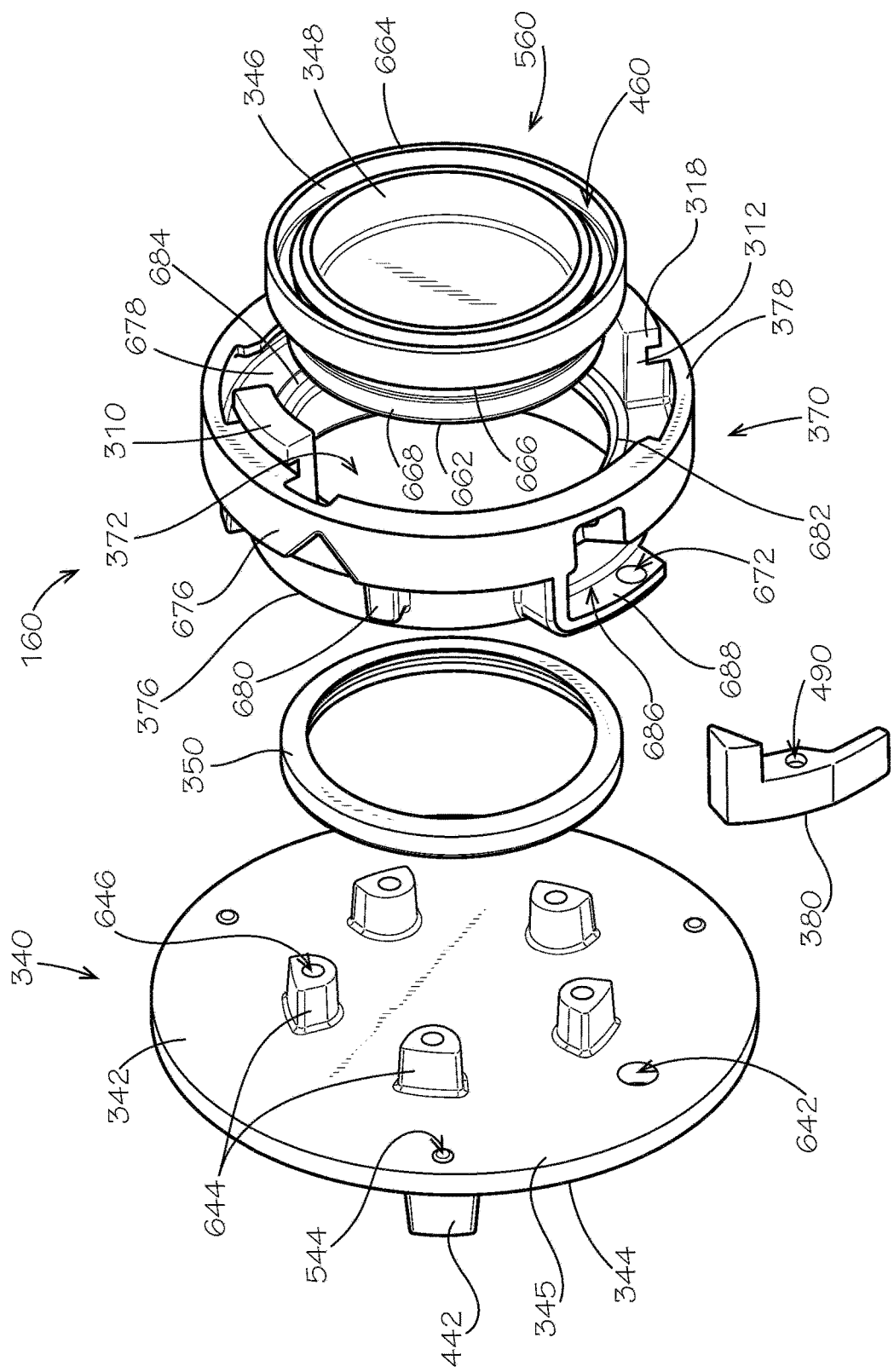
FIG. 6 is an exploded view of the nozzle cap adapter of FIG. 5.

FIG. 6 illustrates an exploded view of the inner housing 340 of FIG. 5 and the nozzle cap adapter 160 of FIG. 5. As shown, the inner housing 340 comprises the housing body 342 defining the first housing body end 344 and second housing body end 345. The primary mounting legs 442 can extend from the first housing body end 344 for mounting the inner housing 340 to the outer housing 230 (shown in FIG. 2). In some aspects, the inner housing 340 can further comprising a clearance hole 642, and the adapter ring 370 can define a first adapter ring key hole 672. The clearance hole 642 and the first adapter ring key hole 672 can be substantially aligned, as described in further detail below. Moreover, in the present aspect, the inner housing 340 can define one or more secondary mounting legs 644 extending from the second housing body end 345 generally in the axial direction. The secondary mounting legs 644 can be oriented radially inward from the primary mounting legs 442 in some aspects. As shown, each of the secondary mounting legs 644 can define a secondary mounting leg hole 646 configured to receive a gasket housing fastener (not shown) therethrough. For example and without limitation, the gasket housing fastener may be a screw or a bolt in some aspects. The gasket housing fastener(s) can be configured to engage the gasket housing 560, as described in further detail below, to couple the gasket housing 560 to the inner housing 340.

In some example aspects, as shown, the adapter ring 370 can be monolithically formed and may not comprise the first and second adapter segments 362,364 (shown in FIG. 3). The adapter ring 370 of the present aspect can be configured differently from the adapter ring 370 shown in the aspect of FIGS. 3-4C. However, similar to the aspect of FIGS. 3-4C, the present adapter ring 370 can define the first adapter ring end 376 and the second adapter ring end 378. The adapter ring 370 can further generally define an outer adapter ring surface 676 and an inner adapter ring surface 678. In the present aspect, one or more adapter ring reinforcement ribs 680 can extend from and be spaced about a circumference of the outer adapter ring surface 676. Furthermore, as shown, an annular adapter ring flange 682 can extend generally radially inward from the inner adapter ring surface 678, and can define a flange upper surface 684 and a flange lower surface (not shown). The nozzle connectors 310 can extend from the second adapter ring end 378 and can be oriented on substantially opposite sides of the adapter ring 370. The nozzle connectors 310 of the present aspect can define the L-shape, comprising the leg 312 and arm 318 as described above, and can be configured to engage the nozzle 140a (shown in FIG. 1A) to secure the nozzle cap assembly 130 (shown in FIG. 1A) to the nozzle 140a.

Moreover, the adapter ring 370 can define a latch alcove 686 formed therein for receiving the latch 380, similar to the latch cutout 410 (shown in FIG. 4A) described above. As shown, the latch 380 can be substantially similar to the latch 380 described above with respect to FIGS. 3-4A. For example, the latch 380 can be substantially L-shaped and can define the key fastener hole 490 extending therethrough. In the present aspect, the latch alcove 686 can be partially bound by a latch shelf 688 extending from the outer adapter ring surface 676, proximate to the first adapter ring end 376 thereof. The latch shelf 688 can define the first adapter ring key hole 672 formed therethrough. In some aspects, the adapter ring 370 can define a second adapter ring key hole (not shown) formed therein, wherein the second adapter ring key hole can be aligned with the first adapter ring key hole 672 and oriented at an opposing side of the latch alcove 686. As such, in example aspects, the latch fastener 382 (shown in FIG. 3) can extend through the first adapter ring key hole 672 and key fastener hole 490, and into the second adapter ring key hole, to couple the latch 380 to the adapter ring 370. In some aspects, when the nozzle cap adapter 160 is mounted to the inner housing 340, a portion of the latch fastener 382 may extend into the clearance hole 642. However, in other aspects, the latch fastener 382 may not extend into the clearance hole 642.

Example aspects of the gasket housing 560 can define a first gasket housing end 662 and a second gasket housing end 664. The outer and inner flanges 346,348 can be formed at the second gasket housing end 664, as shown. Furthermore, an annular gasket housing shoulder 666 can extend generally radially outward from an outer gasket housing surface 668 at a location between the first gasket housing end 662 and the outer and inner flanges 346,348. In some aspects, such as the present aspect, the gasket housing 560 may not be directly coupled to the adapter ring 370. However, in other aspects, the gasket housing 560 may be directly coupled to the adapter ring 370. For example, in one aspect, mechanical fasteners (e.g., screws, nuts and bolts, etc.) may be provided for coupling the gasket housing 560 to the adapter ring 370. In another example aspect, the gasket housing 560 may define external threading configured to thread into internal threading the adapter ring 370 (or vice versa) to couple the gasket housing 560 to the adapter ring 370. To mount the nozzle cap adapter 160 to the inner housing 340, the first adapter ring end 376 of the adapter ring 370 can be positioned to abut the second housing body end 345 of the housing body 342. The gasket housing 560 can then be inserted into the interior void 372 of the adapter ring 370. The annular gasket housing shoulder 666 can engage the flange upper surface 684 of the annular adapter ring flange 682 to retain the adapter ring 370 between the gasket housing 560 and the inner housing 340. Each of the secondary mounting legs 644 can extend into the interior void 372 of the adapter ring 370, and the secondary mounting leg hole 646 of each secondary mounting leg 644 can be aligned with a gasket housing hole (not shown) formed at the first gasket housing end 662. The gasket housing fastener (not shown) can be configured to extend through each of secondary mounting leg 644 holes 646 and into a corresponding one of the gasket housing holes to couple the gasket housing 560, and thus couple the nozzle cap adapter 160, to the inner housing 340.

Figure 7:
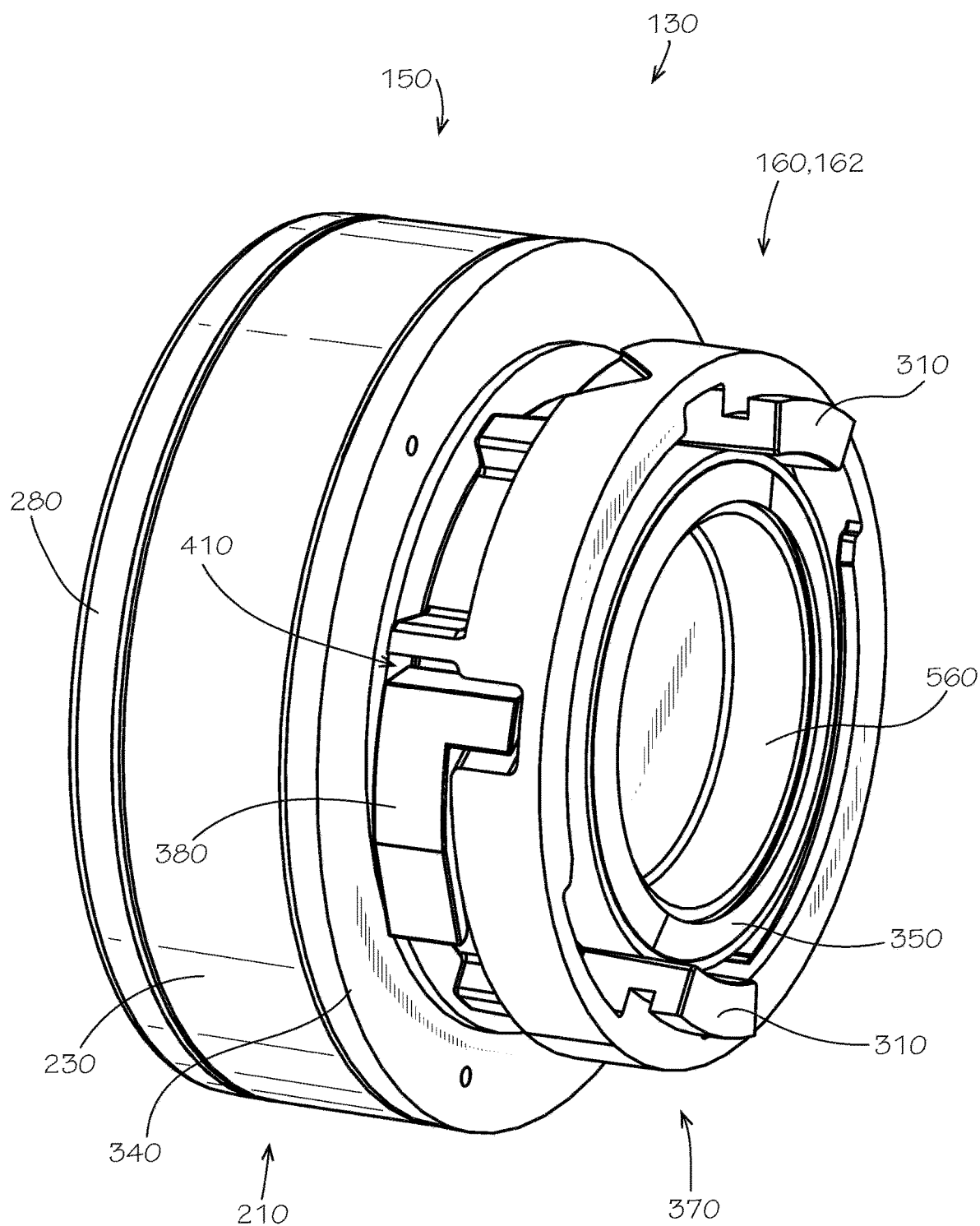
FIG. 7 is a rear perspective view of the nozzle cap coupled to the nozzle cap adapter, in accordance with another aspect of the present disclosure.

FIG. 7 illustrates the nozzle cap assembly 130 comprising the nozzle cap 150 and the nozzle cap adapter 160, in accordance with another aspect of the present disclosure. As shown, the nozzle cap 150 can comprise the cap cover 280 and the cap body 210, and the cap body 210 can comprise the outer housing 230 and the inner housing 340. The nozzle cap adapter 160, such as the U.S. Storz adapter 162, can be coupled to the inner housing 340 of the nozzle cap 150 to allow the nozzle cap 150 to be mounted to the nozzle 140a, such as the U.S. Storz nozzle 142a (both 140a and 142a shown in FIG. 1A), of the fire hydrant 110 (shown in FIG. 1A). The nozzle cap adapter 160 of the present aspect can be similar to the nozzle cap adapter 160 of FIGS. 5-6. For example, the nozzle cap adapter 160 can comprise the adapter ring 370 and the gasket housing 560. Furthermore, the latch 380 can be received in the latch cutout 410 of the adapter ring 370, and the gasket 350 can be received in the gasket groove 460 (shown in FIG. 8) of the gasket housing 560. However, in the present aspect, the inner housing 340 and portions of the adapter ring 370 can be configured differently from the aspect of FIGS. 5-6, as shown and described in further detail below with respect to FIG. 8.

Figure 8:
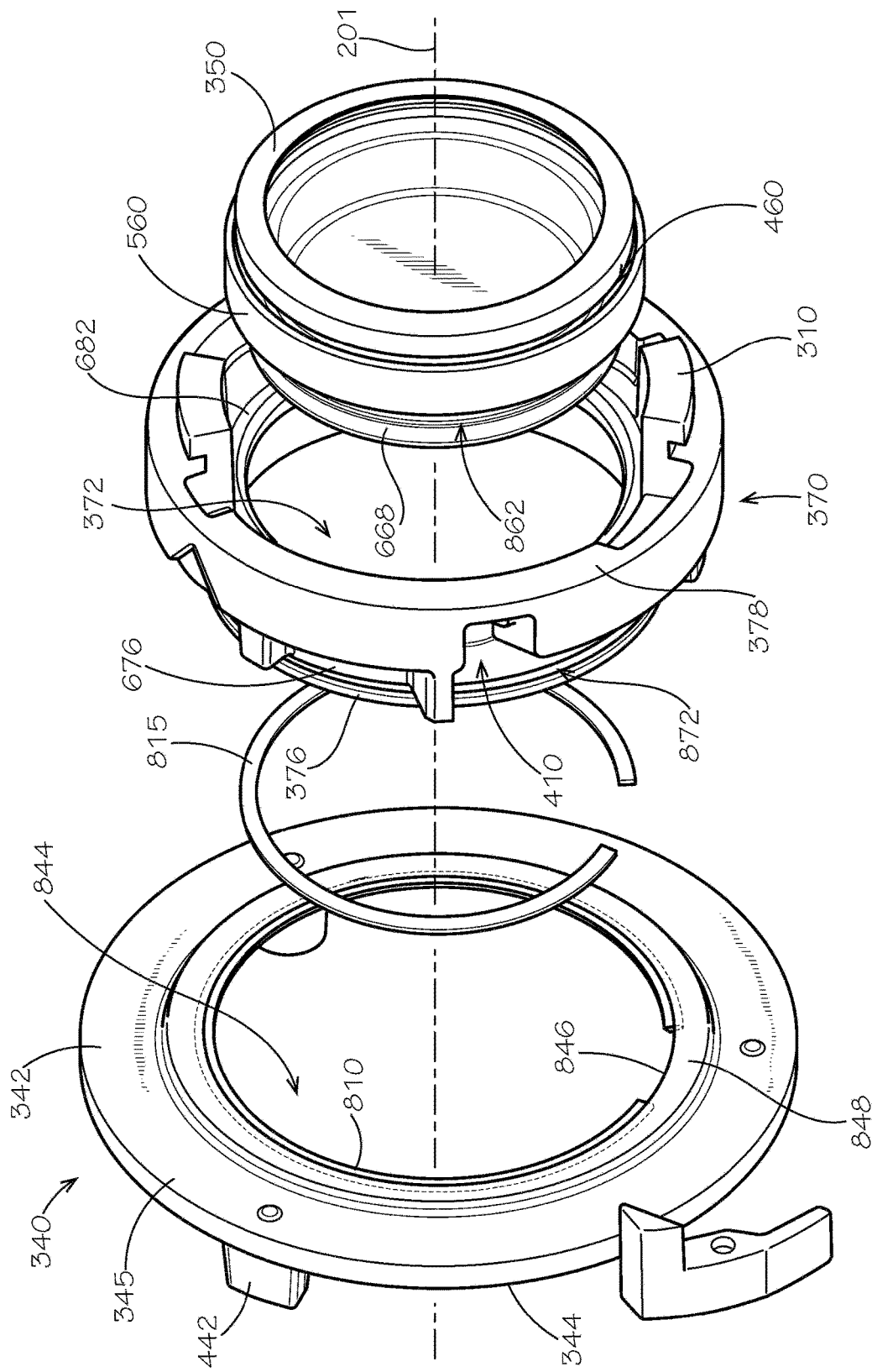
FIG. 8 is an exploded view of the nozzle cap adapter of FIG. 7.

FIG. 8 illustrates an exploded an exploded view of the inner housing 340 of FIG. 7 and the nozzle cap adapter 160 of FIG. 7. The nozzle cap adapter 160 can be similar to the nozzle cap adapter 160 of FIGS. 5-6, as described above. However, in the present aspect, the adapter ring 370 can comprise the latch cutout 410 instead of the latch alcove 686 (shown in FIG. 6). Furthermore, the inner housing 340 can define the housing body 342, and the housing body 342 can define the first housing body end 344 and the second housing body end 345. The primary mounting legs 442 can extend from the first housing body end 344 for engaging the mounting recesses 236 (shown in FIG. 2) of the outer housing 230 (shown in FIG. 2). A housing body opening 844 can be formed substantially through a center of the housing body 342, such that the housing body opening 844 is substantially concentric to the cap axis 201, and can extend from the first housing body end 344 to the second housing body end 345. In the present aspect, a first locking ring 810 can be provided for coupling the adapter ring 370 to the inner housing 340. As shown, the first locking ring 810 can abut an inner housing shoulder 848 formed at a boundary 846 of the housing body opening 844, preventing the first locking ring 810 from advancing through the housing body opening 844 in a direction towards the second housing body end 345. The first adapter ring end 376 can pass through the housing body opening 844, and the first locking ring 810 can be configured to engage an annular adapter ring slot 872 formed in the outer adapter ring surface 676 to couple the adapter ring 370 to the inner housing 340. Furthermore, in the present aspect, a second locking ring 815 can be provided for coupling the gasket housing 560 to the adapter ring 370. The second locking ring 815 can abut the flange lower surface of the annular adapter ring flange 682 to prevent the second locking ring 815 from advancing through the interior void 372 of the adapter ring 370 in a direction towards the nozzle connectors 310. The gasket housing 560 can be inserted into the interior void 372 through the second adapter ring end 378, and the second locking ring 815 can be configured to engage an annular gasket housing slot 862 formed in the outer gasket housing surface 668 of the gasket housing 560 to couple the gasket housing 560 to the adapter ring 370.

Figure 9:
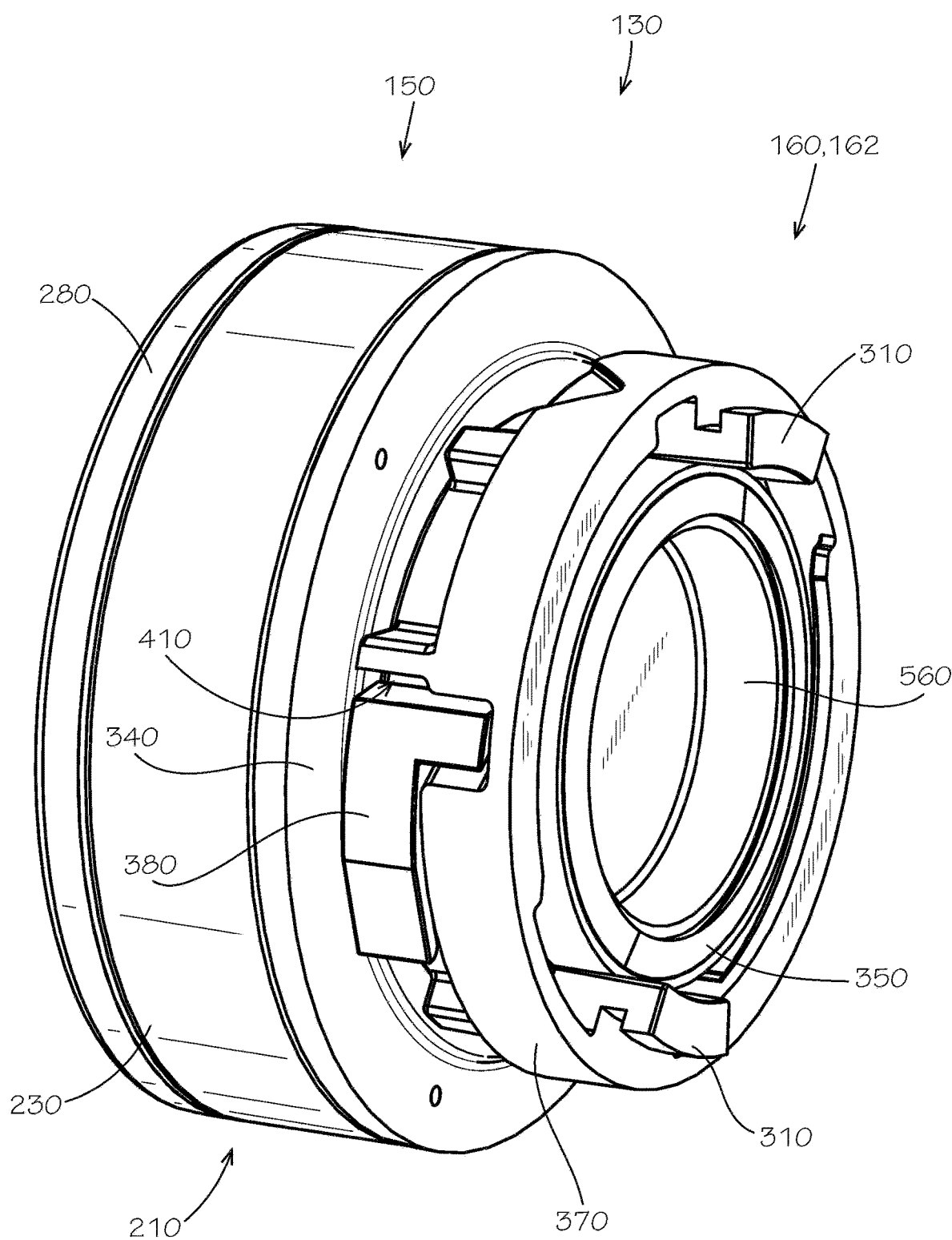
FIG. 9 is a rear perspective view of the nozzle cap coupled to the nozzle cap adapter, in accordance with another aspect of the present disclosure.

FIG. 9 illustrates the nozzle cap assembly 130 comprising the nozzle cap 150 and the nozzle cap adapter 160, in accordance with another aspect of the present disclosure. Again, the nozzle cap 150 can comprise the cap cover 280 and the cap body 210, and the cap body 210 can comprise the outer housing 230 and the inner housing 340. The nozzle cap adapter 160 can be coupled to the inner housing 340 of the nozzle cap 150 to allow the nozzle cap 150 to be mounted to the nozzle 140a (shown in FIG. 1A). The nozzle cap adapter 160 of the present aspect can be similar to the nozzle cap adapters 160 of FIGS. 5-6 and FIGS. 7-8. For example, the nozzle cap adapter 160 can comprise the adapter ring 370 and the gasket housing 560. Furthermore, the latch 380 can be received in the latch cutout 410 of the adapter ring 370, and the gasket 350 can be received in the gasket groove 460 (shown in FIG. 10) of the gasket housing 560. However, in the present aspect, the inner housing 340 and portions of the adapter ring 370 can be configured differently from the aspect of FIG. 5-6, as shown and described in further detail below with respect to FIG. 10.

Figure 10:
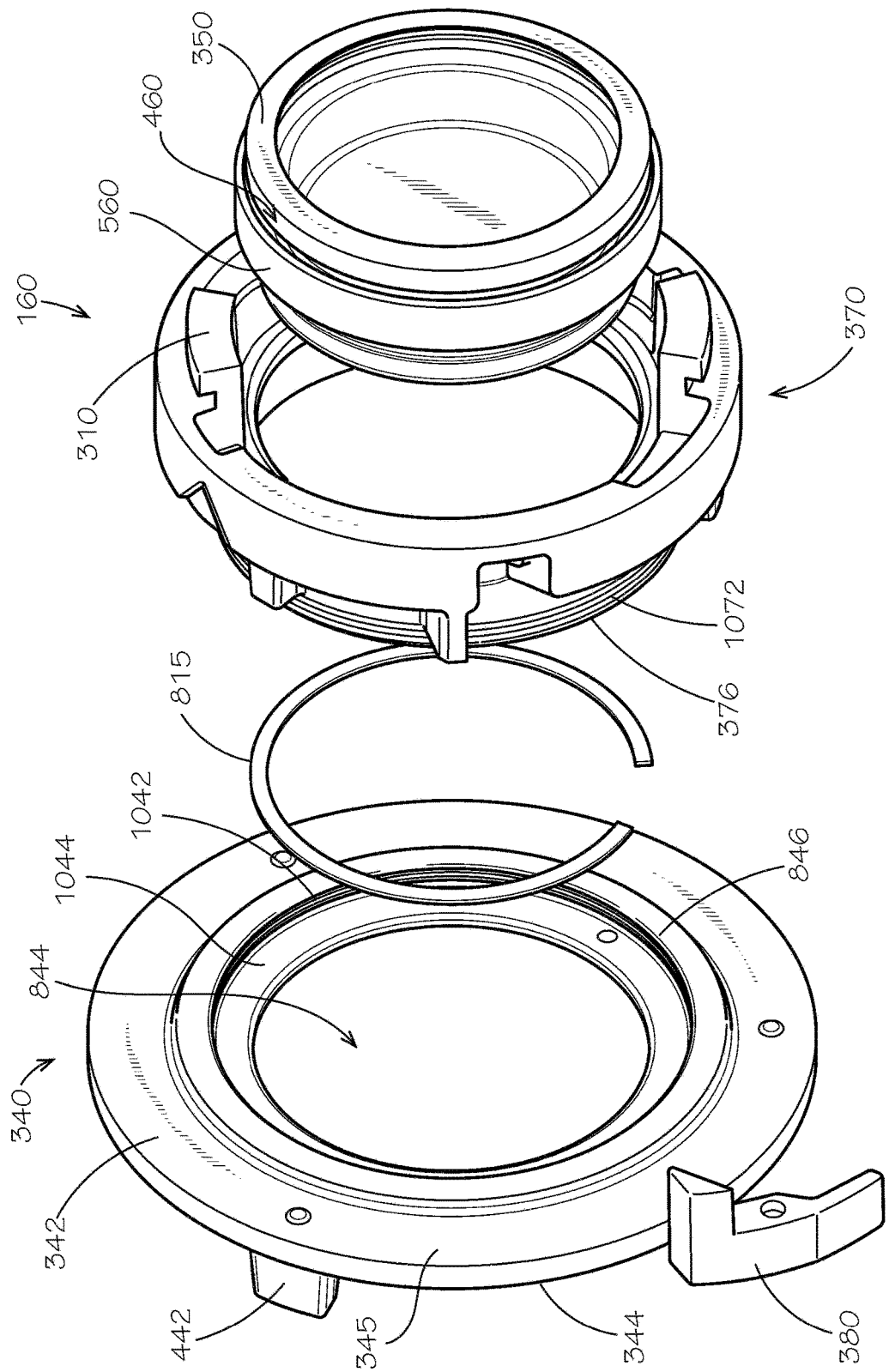
FIG. 10 is an exploded view of the nozzle cap adapter of FIG. 9.

FIG. 10 illustrates the inner housing 340 of FIG. 9 and the nozzle cap adapter 160 of FIG. 9. The gasket housing 560 can be substantially the same as the gasket housing 560 of FIGS. 7-9, and the second locking ring 815 can couple the gasket housing 560 to the adapter ring 370 in the same manner. However, the present aspect does not comprise the first locking ring 810 (shown in FIG. 8). Rather, the inner housing 340 can define internal threading 1042 formed at the boundary 846 of the housing body opening 844. Furthermore, the adapter ring 370 can define external threading 1072 formed on the outer adapter ring surface 676 proximate to the first adapter ring end 376. The external threading 1072 of the adapter ring 370 can thread into the internal threading 1042 of the inner housing 340 to couple the nozzle cap adapter 160 to the inner housing 340. In some example aspects, as shown, the inner housing 340 can define a housing body shoulder 1044 extending radially inward from the boundary 846 of the housing body opening 844 at the first housing body end 344 thereof. The housing body shoulder 1044 can serve as a stop by engaging the first adapter ring end 376 of the adapter ring 370 when the adapter ring 370 is appropriately tightened onto the inner housing 340.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A nozzle cap adapter comprising:
    an adapter ring defining a first adapter ring end, a second adapter ring end opposite the first adapter ring end, and an interior void extending from the first adapter ring end to the second adapter ring end;
    a nozzle connector extending from the second adapter ring end of the adapter ring, the nozzle connector configured to rotatably engage a fire hydrant nozzle; and
    a latch coupled to the adapter ring and configured to removably lock the nozzle cap adapter onto the fire hydrant nozzle;
    a gasket housing extending into the interior void and defining a gasket groove, the gasket groove facing in a direction extending towards the second adapter ring end; and
    a gasket disposed within the gasket groove and configured to abut an end of the fire hydrant nozzle;
    wherein:
        the adapter ring defines outer adapter ring surface and an inner adapter ring surface;
        the inner adapter ring surface defines the interior void;
        a latch alcove extends into the outer adapter ring surface;
        the latch is received within the latch alcove;
        the latch alcove is partially bound by a latch shelf extending formed proximate to the first adapter ring end;
        the latch shelf defines a first adapter ring key hole; and
        a latch fastener extends through the first adapter ring key hole to couple the latch to the adapter ring.

2. The nozzle cap adapter of claim 1, wherein:
    the nozzle connector defines a leg and an arm;
    a proximal end of the leg is coupled to the adapter ring; and
    the arm extends from a distal end of the leg.

3. The nozzle cap adapter of claim 2, wherein the arm extends radially outward from the leg and is oriented about perpendicular to the leg.

4. The nozzle cap adapter of claim 1, wherein a plurality of adapter ring reinforcement ribs extend from the outer adapter ring surface and can be spaced about a circumference of the adapter ring.

5. The nozzle cap adapter of claim 1, wherein:
    the gasket housing defines a first gasket housing end and a second gasket housing end opposite the first gasket housing end;
    the gasket housing defines an outer flange at the second gasket housing end and an inner flange at the second gasket housing end; and
    the gasket groove is defined between the inner flange and the outer flange.

6. The nozzle cap adapter of claim 1, wherein:
    the inner adapter ring surface defines an adapter ring flange extending radially inward;
    the adapter ring flange defines a flange upper surface facing the second adapter ring end;
    the gasket housing defines an outer gasket housing surface; and
    the outer gasket housing surface defines a gasket housing shoulder extending radially outward and engaging the flange upper surface.

7. The nozzle cap adapter of claim 6, wherein the flange upper surface is an annular flange upper surface and the gasket housing shoulder is an annular gasket housing shoulder.

8. The nozzle cap adapter of claim 1, wherein the adapter ring is monolithically formed.

9. The nozzle cap adapter of claim 1, wherein:
    the adapter ring comprises a first adapter segment and a second adapter segment; and
    the first adapter segment is coupled to the second adapter segment by a first adapter segment fastener.

10. The nozzle cap adapter of claim 9, wherein:
    each of the first adapter segment and the second adapter segment define a first adapter segment circumferential end and a second adapter segment circumferential end;
    a first fastener block is formed at each of the first adapter segment circumferential ends;
    a second fastener block is formed at each of the second adapter segment circumferential ends;
    a first adapter segment fastener engages each of the first fastener blocks to couple the first adapter segment circumferential ends together; and
    a second adapter segment fastener engages each of the second fastener blocks to couple the second adapter segment circumferential ends together.

11. A nozzle cap assembly comprising:
    a nozzle cap comprising an outer housing and an inner housing; and
    a nozzle cap adapter coupled to the inner housing, the nozzle cap adapter comprising:

an adapter ring defining an interior void;
a nozzle connector extending from the adapter ring, the nozzle connector configured to engage a fire hydrant nozzle;
a gasket housing extending into the interior void and defining a gasket groove; and
a gasket disposed within the gasket groove and configured to abut an end of the fire hydrant nozzle;
wherein:
the inner housing defines a secondary mounting leg extending into the interior void of the adapter ring;
the secondary mounting leg defines a secondary mounting leg hole;
the gasket housing defines a gasket housing hole aligned with the secondary mounting leg hole; and
a gasket housing fastener extends through the gasket housing hole and into the secondary mounting leg hole to couple the gasket housing and the adapter ring to the inner housing.

12. The nozzle cap assembly of claim 11, wherein:
the nozzle connector defines a leg and an arm;
a proximal end of the leg is coupled to the adapter ring; and
the arm extends radially outward from a distal end of the leg and is oriented about perpendicular to the leg.

13. The nozzle cap assembly of claim 11, further comprising a latch coupled to the adapter ring and configured to removably lock the nozzle cap adapter onto the fire hydrant nozzle, and wherein:
the adapter ring defines outer adapter ring surface and an inner adapter ring surface;
the inner adapter ring surface defines the interior void;
a latch alcove extends into the outer adapter ring surface; and
the latch is received within the latch alcove.

14. The nozzle cap assembly of claim 13, wherein:
the adapter ring defines a first adapter ring key hole;
the inner housing defines a clearance hole aligned with first adapter ring key hole; and
a latch fastener extends through the first adapter ring key hole in into the clearance hole.

15. The nozzle cap assembly of claim 13, wherein:
the gasket housing defines a first gasket housing end and a second gasket housing end opposite the first gasket housing end;
the gasket housing defines an outer flange at the second gasket housing end and an inner flange at the second gasket housing end; and
the gasket groove is defined between the inner flange and the outer flange.

16. The nozzle cap assembly of claim 13, wherein:
the inner adapter ring surface defines an adapter ring flange extending radially inward;
the adapter ring flange defines a flange upper surface;
the gasket housing defines an outer gasket housing surface; and
the outer gasket housing surface defines a gasket housing shoulder extending radially outward and engaging the flange upper surface.

17. The nozzle cap assembly of claim 11, wherein the adapter ring is monolithically formed.

18. A nozzle cap adapter comprising:
an adapter ring defining a first adapter ring end, a second adapter ring end opposite the first adapter ring end, and an interior void extending from the first adapter ring end to the second adapter ring end;
a nozzle connector extending from the second adapter ring end of the adapter ring, the nozzle connector configured to rotatably engage a fire hydrant nozzle; and
a latch coupled to the adapter ring and configured to removably lock the nozzle cap adapter onto the fire hydrant nozzle;
a gasket housing extending into the interior void and defining a gasket groove, the gasket groove facing in a direction extending towards the second adapter ring end; and
a gasket disposed within the gasket groove and configured to abut an end of the fire hydrant nozzle;
wherein:
the adapter ring comprises a first adapter segment and a second adapter segment;
the first adapter segment is coupled to the second adapter segment by a first adapter segment fastener;
each of the first adapter segment and the second adapter segment define a first adapter segment circumferential end and a second adapter segment circumferential end;
a first fastener block is formed at each of the first adapter segment circumferential ends;
a second fastener block is formed at each of the second adapter segment circumferential ends;
a first adapter segment fastener engages each of the first fastener blocks to couple the first adapter segment circumferential ends together; and
a second adapter segment fastener engages each of the second fastener blocks to couple the second adapter segment circumferential ends together.

19. A nozzle cap assembly comprising:
a nozzle cap comprising an outer housing and an inner housing;
a nozzle cap adapter coupled to the inner housing, the nozzle cap adapter comprising:
an adapter ring defining an interior void;
a nozzle connector extending from the adapter ring, the nozzle connector configured to engage a fire hydrant nozzle;
a gasket housing extending into the interior void and defining a gasket groove; and
a gasket disposed within the gasket groove and configured to abut an end of the fire hydrant nozzle; and
a latch coupled to the adapter ring and configured to removably lock the nozzle cap adapter onto the fire hydrant nozzle;
wherein:
the adapter ring defines outer adapter ring surface and an inner adapter ring surface;
the inner adapter ring surface defines the interior void;
a latch alcove extends into the outer adapter ring surface;
the latch is received within the latch alcove;
the adapter ring defines a first adapter ring key hole;
the inner housing defines a clearance hole aligned with first adapter ring key hole; and
a latch fastener extends through the first adapter ring key hole in into the clearance hole.

* * * * *